(12) United States Patent
Jeong et al.

(10) Patent No.: US 11,470,236 B2
(45) Date of Patent: Oct. 11, 2022

(54) IMAGE PROCESSING DEVICE AND IMAGE PROCESSING METHOD FOR COLOR CORRECTION, AND IMAGE PROCESSING SYSTEM INCLUDING THE SAME

(71) Applicant: Samsung Electronics Co., Ltd., Suwon-si (KR)

(72) Inventors: Eunji Jeong, Suwon-si (KR); Deokha Shin, Anyang-si (KR); Youngjun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/318,645

(22) Filed: May 12, 2021

(65) Prior Publication Data

US 2022/0086358 A1 Mar. 17, 2022

(30) Foreign Application Priority Data

Sep. 16, 2020 (KR) .................. 10-2020-0119077

(51) Int. Cl.
*H04N 5/232* (2006.01)
*H04N 9/68* (2006.01)
*H04N 9/04* (2006.01)
*H04N 17/00* (2006.01)
*G06T 7/80* (2017.01)
*G02B 3/00* (2006.01)
*G02B 5/20* (2006.01)

(52) U.S. Cl.
CPC ..... *H04N 5/232122* (2018.08); *G02B 3/0043* (2013.01); *G02B 5/201* (2013.01); *G06T 7/80* (2017.01); *H04N 9/0451* (2018.08); *H04N 9/04555* (2018.08); *H04N 9/04557* (2018.08); *H04N 9/68* (2013.01); *H04N 17/002* (2013.01)

(58) Field of Classification Search
CPC ........... H04N 5/232122; H04N 17/002; H04N 9/0451; H04N 9/04557; H04N 9/04555; H04N 9/68; G06T 7/80
See application file for complete search history.

(56) References Cited

U.S. PATENT DOCUMENTS 8,767,117 B2   7/2014   Miyashita et al.
9,319,599 B2   4/2016   Okazawa et al.
(Continued)

*Primary Examiner* — Brian P Yenke
(74) *Attorney, Agent, or Firm* — Muir Patent Law, PLLC

(57) ABSTRACT

An image processing device includes a memory and a color correction circuit. The memory stores first correction information that used for correcting first pixel values among a plurality of pixel values. The plurality of pixel values are received from an auto-focus image sensor including first pixels configured to detect a phase difference and second pixels configured to detect an image. The first pixel values are obtained from the first pixels and correspond to a first color. The first correction information is used for correcting the first pixel values to correspond to a second color different from the first color. The color correction circuit receives first image frame data including the plurality of pixel values from the auto-focus image sensor, loads the first correction information from the memory, and generates first corrected image frame data by correcting the first pixel values included in the first image frame data to correspond to the second color based on the first correction information.

20 Claims, 32 Drawing Sheets

(56) References Cited

U.S. PATENT DOCUMENTS

| | | | |
|---|---|---|---|
| 9,398,207 B2 | 7/2016 | Okazawa | |
| 9,451,160 B2 | 9/2016 | Okazawa | |
| 9,635,292 B2 | 4/2017 | Furuya | |
| 9,711,553 B2* | 7/2017 | Kim | H01L 27/14621 |
| 9,824,417 B2* | 11/2017 | Kim | H04N 13/204 |
| 9,860,438 B2* | 1/2018 | Nakata | H04N 5/265 |
| 10,212,332 B2 | 2/2019 | Sano | |
| 10,264,174 B2* | 4/2019 | Kim | H04N 5/23218 |
| 10,715,718 B2* | 7/2020 | Liu | H04N 5/36961 |
| 11,138,707 B2* | 10/2021 | Yeo | G16H 40/63 |
| 11,228,723 B2* | 1/2022 | Hanwell | H04N 5/3675 |
| 2010/0194967 A1* | 8/2010 | Amano | H04N 5/232123 348/E5.045 |
| 2010/0245631 A1* | 9/2010 | Hoda | H04N 5/378 348/E5.079 |
| 2014/0036134 A1* | 2/2014 | Miyatani | H04N 5/232122 348/345 |
| 2016/0225805 A1* | 8/2016 | Keelan | H04N 9/077 |
| 2016/0231468 A1* | 8/2016 | Ootsuka | H01L 27/14623 |
| 2018/0063411 A1* | 3/2018 | Rivard | H04N 5/23219 |
| 2018/0077338 A1* | 3/2018 | Shimada | H04N 5/232122 |
| 2018/0084187 A1* | 3/2018 | Park | H04N 5/35554 |
| 2018/0152651 A1* | 5/2018 | Matsunaga | H04N 5/3696 |
| 2019/0075233 A1* | 3/2019 | Galor Gluskin | H04N 9/04557 |
| 2019/0141255 A1* | 5/2019 | Hamano | H04N 5/2354 |
| 2019/0215440 A1* | 7/2019 | Rivard | G02B 27/28 |
| 2019/0335110 A1* | 10/2019 | Kobayashi | H04N 9/0455 |
| 2019/0394408 A1* | 12/2019 | Tanaka | H04N 5/2176 |
| 2020/0045223 A1* | 2/2020 | Pang | H01L 27/14621 |
| 2020/0260029 A1* | 8/2020 | Kang | H04N 13/246 |
| 2020/0288074 A1* | 9/2020 | Hanwell | H04N 9/04551 |
| 2020/0336684 A1* | 10/2020 | Wang | H04N 9/04515 |
| 2020/0404156 A1* | 12/2020 | Aoki | H04N 5/225 |
| 2021/0211580 A1* | 7/2021 | Galor Gluskin | H04N 5/3696 |
| 2021/0233950 A1* | 7/2021 | Jang | H04N 5/232122 |
| 2021/0243367 A1* | 8/2021 | Park | G06T 7/80 |
| 2022/0086358 A1* | 3/2022 | Jeong | H04N 9/04555 |

* cited by examiner

600

CFA1

| W | G | W | B | W | G |
| G | W | B | W | G | W |
| W | R | G || W | R |
| R | W | G | W | R | W |
| W | G | W | B | W | G |
| G | W | B | W | G | W |

FIG. 7A

FDAT11

| PV11W | PV12G | PV13W | PV14B | PV15W | PV16G |
|-------|-------|-------|-------|-------|-------|
| PV21G | PV22W | PV23B | PV24W | PV25G | PV26W |
| PV31W | PV32R | PV33G | PV34G | PV35W | PV36R |
| PV41R | PV42W | PV43G | PV44W | PV45R | PV46W |
| PV51W | PV52G | PV53W | PV54B | PV55W | PV56G |
| PV61G | PV62W | PV63B | PV64W | PV65G | PV66W |

FIG. 7B

CINF11

FIG. 7C

CFDAT11

| PV11W | PV12G | PV13W | PV14B | PV15W | PV16G |
|---|---|---|---|---|---|
| PV21G | PV22W | PV23B | PV24W | PV25G | PV26W |
| PV31W | PV32R | PV33Wc | PV34G | PV35W | PV36R |
| PV41R | PV42W | PV43G | PV44W | PV45R | PV46W |
| PV51W | PV52G | PV53W | PV54B | PV55W | PV56G |
| PV61G | PV62W | PV63B | PV64W | PV65G | PV66W |

CFAA1

| G | R | G | R | G | R |
|---|---|---|---|---|---|
| B | W | B | W | B | W |
| G | R | G | R | G | R |
| B | W | B | W | B | W |
| G | R | G | R | G | R |
| B | W | B | W | B | W |

FIG. 17B

FDATA1

| PVA1G | PVA2R | PVA3G | PVA4R | PVA5G | PVA6R |
|-------|-------|-------|-------|-------|-------|
| PVB1B | PVB2W | PVB3B | PVB4W | PVB5B | PVB6W |
| PVC1G | PVC2R | PVC3G | PVC4R | PVC5G | PVC6R |
| PVD1B | PVD2W | PVD3B | PVD4W | PVD5B | PVD6W |
| PVE1G | PVE2R | PVE3G | PVE4R | PVE5G | PVE6R |
| PVF1B | PVF2W | PVF3B | PVF4W | PVF5B | PVF6W |

FIG. 17C

CINFA1

| | | | | | |
|---|---|---|---|---|---|
| | CIB2 | | CIB4 | | CIB6 |
| | | | | | |
| | CID2 | | CID4 | | CID6 |
| | | | | | |
| | CIF2 | | CIF4 | | CIF6 |

FIG. 17D

CFDATA1

| PVA1G | PVA2R | PVA3G | PVA4R | PVA5G | PVA6R |
|-------|-------|-------|-------|-------|-------|
| PVB1B | PVB2Gc | PVB3B | PVB4Gc | PVB5B | PVB6Gc |
| PVC1G | PVC2R | PVC3G | PVC4R | PVC5G | PVC6R |
| PVD1B | PVD2Gc | PVD3B | PVD4Gc | PVD5B | PVD6Gc |
| PVE1G | PVE2R | PVE3G | PVE4R | PVE5G | PVE6R |
| PVF1B | PVF2Gc | PVF3B | PVF4Gc | PVF5B | PVF6Gc |

CFAA2

| W | G | W | B | W | G |
| W | W | B | W | G | W |
| W | R | W | G | W | R |
| R | W | G | W | R | W |
| W | G | W | B | W | G |
| G | W | B | W | G | W |

FIG. 18B

FDATA2

| PVG1W | PVG2G | PVG3W | PVG4B | PVG5W | PVG6G |
|-------|-------|-------|-------|-------|-------|
| PVH1G | PVH2W | PVH3B | PVH4W | PVH5G | PVH6W |
| PVJ1W | PVJ2R | PVJ3W | PVJ4G | PVJ5W | PVJ6R |
| PVK1R | PVK2W | PVK3G | PVK4W | PVK5R | PVK6W |
| PVL1W | PVL2G | PVL3W | PVL4B | PVL5W | PVL6G |
| PVM1G | PVM2W | PVM3B | PVM4W | PVM5G | PVM6W |

FIG. 18C

CINFA2

| CIG1 |      | CIG3 |      | CIG5 |      |
|------|------|------|------|------|------|
|      | CIH2 |      | CIH4 |      | CIH6 |
| CIJ1 |      | CIJ3 |      | CIJ5 |      |
|      | CIK2 |      | CIK4 |      | CIK6 |
| CIL1 |      | CIL3 |      | CIL5 |      |
|      | CIM2 |      | CIM4 |      | CIM6 |

FIG. 18D

CFDATA2

| PVG1Gc | PVG2G  | PVG3Bc | PVG4B  | PVG5Gc | PVG6G  |
|--------|--------|--------|--------|--------|--------|
| PVH1G  | PVH2Gc | PVH3B  | PVH4Bc | PVH5G  | PVH6Gc |
| PVJ1Rc | PVJ2R  | PVJ3Gc | PVJ4G  | PVJ5Rc | PVJ6R  |
| PVK1R  | PVK2Rc | PVK3G  | PVK4Gc | PVK5R  | PVK6Rc |
| PVL1Gc | PVL2G  | PVL3Bc | PVL4B  | PVL5Gc | PVL6G  |
| PVM1G  | PVM2Gc | PVM3B  | PVM4Bc | PVM5G  | PVM6Gc |

IMAGE PROCESSING DEVICE AND IMAGE PROCESSING METHOD FOR COLOR CORRECTION, AND IMAGE PROCESSING SYSTEM INCLUDING THE SAME

CROSS-REFERENCE TO RELATED APPLICATION

This application claims priority under 35 USC § 119 to Korean Patent Application No. 10-2020-0119077, filed on Sep. 16, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to image processing devices and image processing methods for color correction, and image processing systems including the image processing devices.

2. Description of the Related Art

A complementary metal oxide semiconductor (CMOS) image sensor is an image capturing device manufactured using CMOS processes. The CMOS image sensor typically has lower manufacturing costs and a smaller pixel size than conventional charge coupled device (CCD) image sensors that typically utilize relatively high-voltage analog circuits. Accordingly, CMOS-type image sensors may have lower power consumption requirements relative to CCD-type image sensors. Moreover, with the continued improvement in performance of CMOS image sensors, CMOS image sensors are becoming more widely used in mobile electronic devices such as smart phones, tablet personal computers (PCs), and digital cameras.

In a digital image processing device such as a camera, it may be helpful to detect a focus control state of a photographing lens to automatically control a focus of the lens. To achieve this, a conventional digital image processing device includes an additional focus detecting device that is separate and/or different from an image sensor. In this case, costs of the focus detecting device and/or an additional optical lens may be increased and/or an entire size of the digital image processing device may be increased by the focus detecting device. To address these concerns, an auto-focus image sensor using a method of detecting a phase difference has been developed. In addition, various schemes of processing image signals output from the auto-focus image sensor have been researched for the image quality enhancement or improvement.

SUMMARY

At least one example embodiment of the present disclosure provides an image processing device capable of correcting pixel values of a specific color output from an auto-focus image sensor or an image sensor.

At least one example embodiment of the present disclosure provides an image processing method capable of correcting pixel values of a specific color output from an auto-focus image sensor or an image sensor.

At least one example embodiment of the present disclosure provides an image processing system including the image processing device According to example embodiments, an image processing device includes a memory and a color correction circuit. The memory stores first correction information for correcting first pixel values among a plurality of pixel values. The plurality of pixel values are received from an auto-focus image sensor including first pixels configured to detect a phase difference and second pixels configured to detect an image. The first pixel values are obtained from the first pixels and correspond to a first color. The first correction information is used for correcting the first pixel values to correspond to a second color different from the first color. The color correction circuit receives first image frame data including the plurality of pixel values from the auto-focus image sensor, loads the first correction information from the memory, and generates first corrected image frame data by correcting the first pixel values included in the first image frame data to correspond to the second color based on the first correction information.

According to example embodiments, in an image processing method, first correction information for correcting first pixel values among a plurality of pixel values is generated. The plurality of pixel values are received from an auto-focus image sensor including first pixels configured to detect a phase difference and second pixels configured to detect an image. The first pixel values are obtained from the first pixels and correspond to a first color. The first correction information is used for correcting the first pixel values to correspond to a second color different from the first color. The first correction information is stored in a memory. First image frame data including the plurality of pixel values is received from the auto-focus image sensor. The first correction information is loaded from the memory. First corrected image frame data is generated by correcting the first pixel values included in the first image frame data to correspond to the second color based on the first correction information.

According to example embodiments, an image processing system includes an auto-focus image sensor and an image processing device. The auto-focus image sensor includes first pixels configured to detect a phase difference and second pixels configured to detect an image. The image processing device performs an image processing operation on image frame data provided from the auto-focus image sensor. The image processing device includes a calibration circuit, a memory and a color correction circuit. The calibration circuit receives reference image frame data obtained by capturing a reference pattern by the auto-focus image sensor, compares original image data corresponding to the reference pattern with the reference image frame data, and calculates first correction information based on a result of comparing the original image data with the reference image frame data. The first correction information is used for correcting first pixel values among a plurality of pixel values received from the auto-focus image sensor. The first pixel values are obtained from the first pixels and correspond to a first color. The first correction information is used for correcting the first pixel values to correspond to a second color different from the first color. The memory receives the first correction information from the calibration circuit, and stores the first correction information. The color correction circuit receives first image frame data including the plurality of pixel values from the auto-focus image sensor, loads the first correction information from the memory, and generates first corrected image frame data by correcting the first pixel values included in the first image frame data to correspond to the second color based on the first correction information. The first correction information includes a plurality of gains, a plurality of offsets and a plurality of position data. The plurality of gains and the plurality of offsets are used for converting the first pixel values corresponding to the first color into first corrected pixel values corresponding to the second color. The plurality of position data represent positions of the first pixels. The calibration circuit and the memory generate the first correction information and store the first correction information before the auto-focus image sensor normally operates.

According to example embodiments, an image processing device includes a memory and a color correction circuit. The memory stores first correction information for correcting first pixel values among a plurality of pixel values. The plurality of pixel values are received from an image sensor including a plurality of pixels configured to detect an image. The first pixel values correspond to a first color. The first correction information is used for correcting the first pixel values to correspond to a second color different from the first color. The color correction circuit receives first image frame data including the plurality of pixel values from the image sensor, loads the first correction information from the memory, and generates first corrected image frame data by correcting the first pixel values included in the first image frame data to correspond to the second color based on the first correction information.

In the image processing device, the image processing method, and the image processing system according to example embodiments, the pixel values of the phase detection pixels included in the auto-focus image sensor may be corrected or converted into heterogeneous colors. The image processing device may obtain the correction information for the correction operation in advance, may store the correction information in the memory in advance, may load the correction information for each image frame, and may perform the correction operation based on the loaded correction information, instead of generating and calculating the correction information for the correction operation for each image frame. In addition, the pixel values received from the image sensor other than the auto-focus image sensor may also be corrected or converted into heterogeneous colors based on the correction information obtained and stored in advance. Accordingly, the amount of calculation, calculation time, power consumption, etc. for the correction operation may be reduced, and the image processing device may have improved or enhanced performance.

BRIEF DESCRIPTION OF THE DRAWINGS

Illustrative, non-limiting example embodiments will be more clearly understood from the following detailed description taken in conjunction with the accompanying drawings.

FIGS. 7A, 7B, 7C, 8A, 8B and 9 are diagrams for describing an operation of an image processing device according to example embodiments.

FIGS. 17A, 17B, 17C, 17D, 18A, 18B, 18C and 18D are diagrams for describing an operation of an image processing device according to example embodiments.

DETAILED DESCRIPTION OF THE EMBODIMENTS

Figure 1:
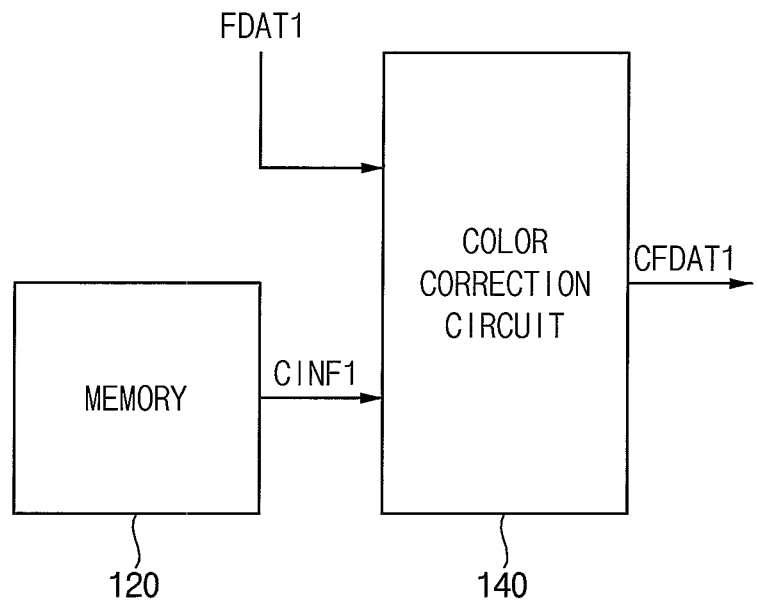
FIG. 1 is a block diagram illustrating an image processing device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating an image processing device according to example embodiments.

Referring to FIG. 1, an image processing device 100 includes a memory 120 and a color correction circuit 140.

The memory 120 stores and outputs first correction information CINF1. The first correction information CINF1 is used for correcting first pixel values among a plurality of pixel values that are received from an auto-focus image sensor (e.g., an auto-focus image sensor 220 in FIG. 2) located outside the image processing device 100. As will be described with reference to FIGS. 5A, 5B and 5C, the auto-focus image sensor includes first pixels that detect a phase difference and second pixels that detect an image, the first pixel values are obtained from the first pixels and correspond to a first color, and the first correction information CINF1 is used for correcting the first pixel values to correspond to a second color different from the first color. For example, the first correction information CINF1 may include data for correcting or converting pixel values of phase detection pixels into heterogeneous colors (or different colors). For example, each of the plurality of pixel values may include a grayscale value, a luminance value and/or a brightness value of a respective one of the plurality of pixels.

In some example embodiments, the memory 120 may include any nonvolatile memories, e.g., an electrically erasable programmable read-only memory (EEPROM), a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc., and/or any volatile memories, e.g., a dynamic random access memory (DRAM), a static random access memory (SRAM), etc.

In some example embodiments, the first correction information CINF1 may be pre-obtained (or obtained in advance) and may be pre-stored (or stored in advance) in the memory 120 before the image processing device 100 normally operates and/or before the auto-focus image sensor normally operates.

In some example embodiments, the first correction information CINF1 may be generated by a calibration circuit (e.g., a calibration circuit 110 in FIG. 10) disposed inside or outside the image processing device 100. An operation of generating the first correction information CINF1 will be described with reference to FIGS. 10 and 11.

The color correction circuit 140 receives first image frame data FDAT1 including the plurality of pixel values from the auto-focus image sensor, loads the first correction information CINF1 from the memory 120, and generates first corrected image frame data CFDAT1 based on the first correction information CINF1 and the first image frame data FDAT1. For example, in one embodiment, the color correction circuit 140 generates the first corrected image frame data CFDAT1 by correcting the first pixel values included in the first image frame data FDAT1 to correspond to the second color based on the first correction information CINF1. For example, the first image frame data FDAT1 and the first corrected image frame data CFDAT1 may correspond to one image frame provided from the auto-focus image sensor. An operation of the color correction circuit 140 will be described in detail with reference to FIGS. 7 through 9.

The image processing device 100 according to example embodiments may correct or convert the pixel values of the phase detection pixels included in the auto-focus image sensor into heterogeneous colors. The image processing device 100 may obtain the correction information CINF1 for the correction operation in advance, may store the correction information CINF1 in the memory 120 in advance, may load the correction information CINF1 for each image frame, and may perform the correction operation based on the loaded correction information CINF1, instead of generating and calculating the correction information for the correction operation for each image frame. Accordingly, the amount of calculation, calculation time, power consumption, etc. for the correction operation may be reduced, and the image processing device 100 may have improved or enhanced performance.

Figure 2:
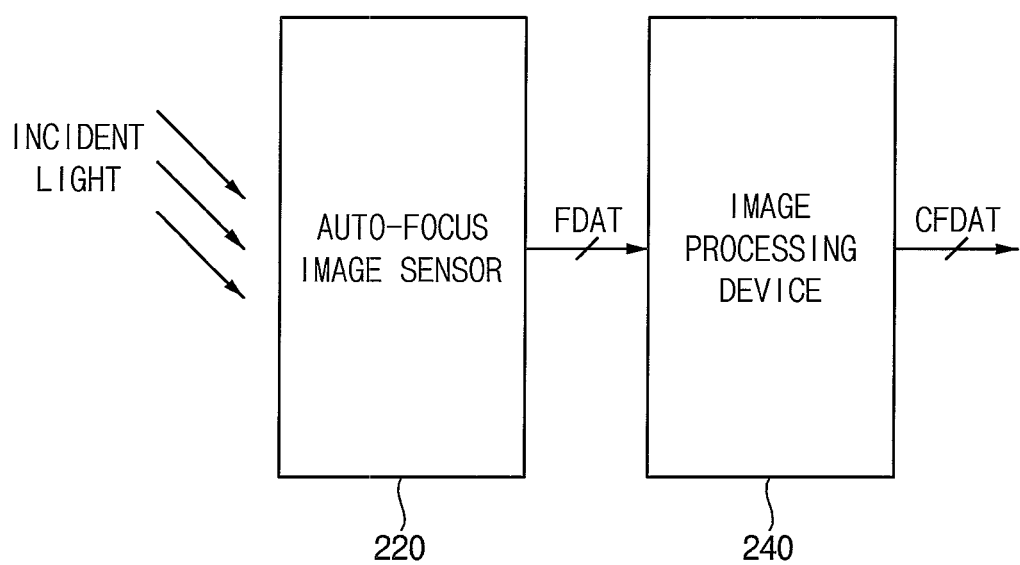
FIG. 2 is a block diagram illustrating an image processing system according to example embodiments.

FIG. 2 is a block diagram illustrating an image processing system according to example embodiments.

Referring to FIG. 2, an image processing system 200 includes an auto-focus image sensor 220 and an image processing device 240.

The auto-focus image sensor 220 sequentially outputs a plurality of image frame data FDAT including information associated with an image of an object based on incident light. Each of the plurality of image frame data FDAT may include a plurality of pixel values obtained from a plurality of pixels included in the auto-focus image sensor 220. For example, the first image frame data FDAT1 in FIG. 1 may be included in the plurality of image frame data FDAT. A configuration and operation of the auto-focus image sensor 220 will be described in detail with reference to FIGS. 3 through 6.

The image processing device 240 sequentially receives the plurality of image frame data FDAT, and sequentially generates a plurality of corrected image frame data CFDAT by sequentially correcting the plurality of image frame data FDAT. The image processing device 240 may be implemented according to example embodiments. The image processing device 240 may obtain and store in advance correction information (e.g., the first correction information CINF1 in FIG. 1) used for correction operation, and may perform the correction operation for each image frame based on the correction information that is stored in advance.

In some example embodiments, the image processing device 240 may be the image processing device 100 of FIG. 1. In other example embodiments, the image processing device 240 may be one of image processing devices 100a, 100b and 100c of FIGS. 10, 12 and 13. The image processing device 240 may be referred to as an image signal processor (ISP).

In some example embodiments, the image processing device 240 may additionally perform at least one image processing operation such as image interpolation, demosaic, white balance, gamma correction, color conversion, etc.

Figure 3:
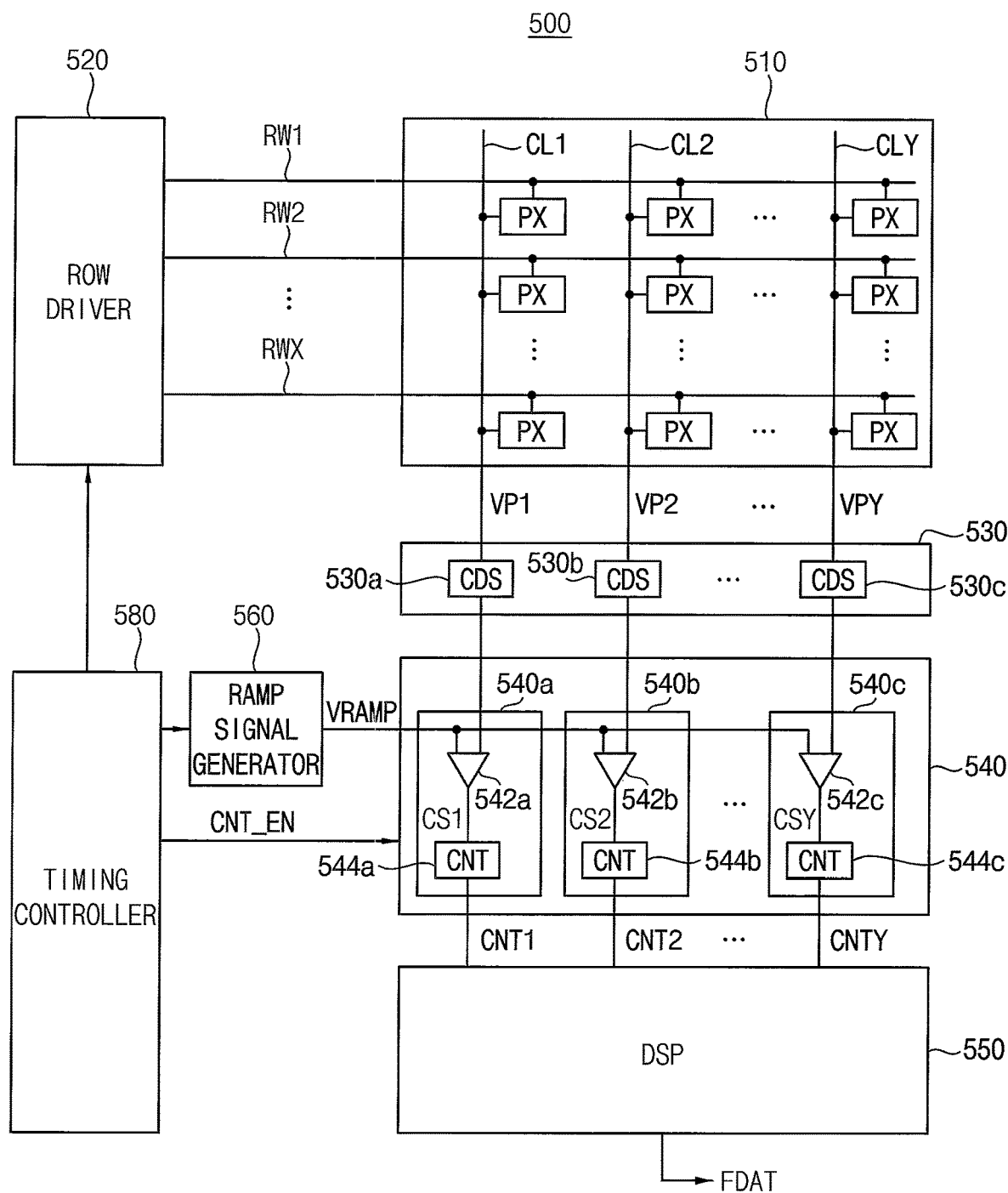
FIG. 3 is a block diagram illustrating an example of an auto-focus image sensor included in an image processing system according to example embodiments.

FIG. 3 is a block diagram illustrating an example of an auto-focus image sensor included in an image processing system according to example embodiments.

Referring to FIG. 3, an auto-focus image sensor 500 includes a pixel array 510, a correlated double sampling (CDS) block 530 and an analog-to-digital converting (ADC) block 540. The auto-focus image sensor 500 may further include a row driver 520, a digital signal processor 550, a ramp signal generator 560 and a timing controller 580. As is traditional in the field of the disclosed technology, features and embodiments are described, and illustrated in the drawings, in terms of functional blocks, units and/or modules, or components described with ~er or ~or. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software.

The pixel array 510 includes a plurality of pixels (or unit pixels) PX that are arranged in a matrix formation. Each of the plurality of pixels PX may be connected to a respective one of a plurality of rows RW1, RW2, ..., RWX and a respective one of a plurality of columns CL1, CL2, ..., CLY, where each of X and Y is a natural number greater than or equal to two. The pixel array 510 generates a plurality of analog pixel signals VP1, VP2, ..., VPY based on incident light. Pixels implemented in hardware, such as pixels PX may be referred to herein as sensor pixels.

The plurality of pixels PX may include first pixels that detect a phase difference and second pixels that detect an image. Configurations of each of the plurality of pixels PX and the pixel array 510 will be described in detail with reference to FIGS. 4 and 5.

The row driver 520 may be connected to the plurality of rows RW1 through RWX of the pixel array 510. The row driver 520 may generate driving signals to drive the plurality of rows RW1 through RWX. For example, the row driver 520 may drive the plurality of pixels PX included in the pixel array 510 row by row.

The correlated double sampling block 530 may include a plurality of correlated double sampling circuits (CDSs) 530a, 530b, . . . , 530c. The plurality of correlated double sampling circuits 530a through 530c may be connected to the plurality of columns CL1 through CLY of the pixel array 510. The plurality of correlated double sampling circuits 530a through 530c may perform a correlated double sampling operation on the plurality of analog pixel signals VP1 through VPY output from the pixel array 510.

The analog-to-digital converting block 540 includes a plurality of analog-to-digital converters 540a, 540b, . . . , 540c. The plurality of analog-to-digital converters 540a through 540c are connected to the plurality of columns CL1 through CLY of the pixel array 510 via the plurality of correlated double sampling circuits 530a through 530c. The plurality of analog-to-digital converters 540a through 540c perform a column analog-to-digital converting operation that converts the plurality of analog pixel signals VP1 through VPY (e.g., a plurality of correlated double sampled analog pixel signals output from the plurality of correlated double sampling circuits 530a through 530c) into a plurality of digital signals CNT1, CNT2, . . . , CNTY in parallel (e.g., simultaneously or concurrently).

Each of the plurality of analog-to-digital converters 540a through 540c may include a respective one of a plurality of comparators 542a, 542b, . . . , 542c and a respective one of a plurality of counters (CNTs) 544a, 544b, . . . , 544c. For example, the first analog-to-digital converter 540a may include the first comparator 542a and the first counter 544a. The first comparator 542a may compare the first analog pixel signal VP1 (e.g., the correlated double sampled first analog pixel signal output from the first correlated double sampling circuit 530a) with a ramp signal VRAMP to generate a first comparison signal CS1. The first counter 544a may count a level transition timing of the first comparison signal CS1 to generate the first digital signal CNT1.

Operations of the correlated double sampling block 530 and the analog-to-digital converting block 540 may be performed on the plurality of pixels PX included in the pixel array 510 row by row.

The plurality of correlated double sampling circuits 530a through 530c and the plurality of analog-to-digital converters 540a through 540c may form a plurality of column driving circuits. For example, the first correlated double sampling circuit 530a and the first analog-to-digital converter 540a may form a first column driving circuit.

The digital signal processor 550 may perform a digital signal processing operation based on the plurality of digital signals CNT1 through CNTY. For example, an operation of obtaining auto-focus information using the first pixels and an operation of obtaining an image frame using the second pixels may be performed by the digital signal processor 550. The digital signal processor 550 may sequentially output a plurality of image frame data FDAT generated by the digital signal processing operation.

In some example embodiments, the digital signal processor 550 may be omitted, and the above-described digital signal processing operation may be performed by a signal processing device (e.g., the image processing device 240 in FIG. 2) located outside the auto-focus image sensor 500.

The ramp signal generator 560 may generate the ramp signal VRAMP. The timing controller 580 may control overall operation timings of the auto-focus image sensor 500, and may generate control signals including a count enable signal CNT_EN, a clock signal (not illustrated), etc.

Figure 4:
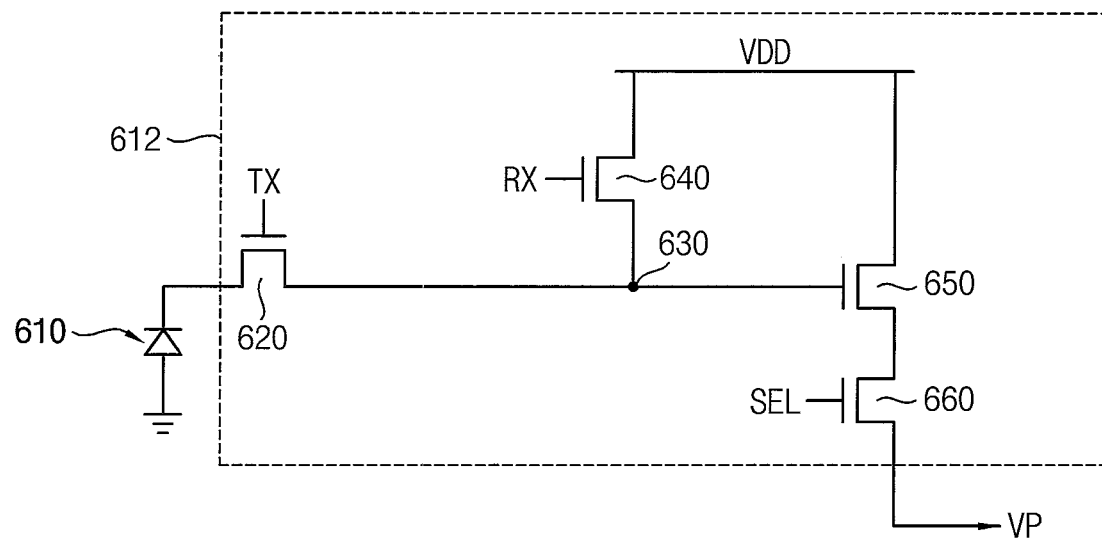
FIG. 4 is a circuit diagram illustrating an example of a pixel included in a pixel array included in an auto-focus image sensor of FIG. 3.

FIG. 4 is a circuit diagram illustrating an example of a pixel included in a pixel array included in an auto-focus image sensor of FIG. 3.

Referring to FIG. 4, a pixel (or unit pixel) 600 may include a photoelectric conversion unit 610 and a signal generation unit 612. The first pixels AFP that detect a phase difference and the second pixels that detect an image among the plurality of pixels PX included in the pixel array 510 in FIG. 3 may have the same pixel structure and circuit structure, except that configurations of micro lenses and color filters are different from each other as will be described with reference to FIGS. 5A, 5B and 5C.

The photoelectric conversion unit 610 may perform a photoelectric conversion operation. For example, the photoelectric conversion unit 610 may convert the incident light into photo-charges during an integration mode. If an image sensor including the pixel 600 is a complementary metal oxide semiconductor (CMOS) image sensor, image information on an object to be captured may be obtained by collecting charge carriers (e.g., electron-hole pairs) in the photoelectric conversion unit 610 proportional to intensity of the incident light through an open shutter of the CMOS image sensor during the integration mode.

The signal generation unit 612 may generate an electric signal (e.g., an analog pixel signal VP) based on the photo-charges generated by the photoelectric conversion operation during a readout mode. If the image sensor including the pixel 600 is the CMOS image sensor, the shutter may be closed, and the analog pixel signal VP may be generated based on the image information in a form of the charge carriers during the readout mode after the integration mode. As illustrated in FIG. 4, in some embodiments, the pixel 600 may have four-transistor structure including four transistors.

For example, the signal generation unit 612 may include a transfer transistor 620, a reset transistor 640, a driving transistor 650, a selection transistor 660 and a floating diffusion node 630. The transfer transistor 620 may be connected between the photoelectric conversion unit 610 and the floating diffusion node 630, and may include a gate electrode receiving a transfer signal TX. The reset transistor 640 may be connected between a power supply voltage VDD and the floating diffusion node 630, and may include a gate electrode receiving a reset signal RX. The driving transistor 650 may be connected between the power supply voltage VDD and the selection transistor 660, and may include a gate electrode connected to the floating diffusion node 630. The selection transistor 660 may be connected between the driving transistor 650 and an output terminal outputting the analog pixel signal VP, and may include a gate electrode receiving a selection signal SEL.

In some example embodiments, one signal generation unit may be shared by a plurality of photoelectric conversion units, to form a single unit pixel having a plurality of photoelectric conversion units.

Figure 5A:
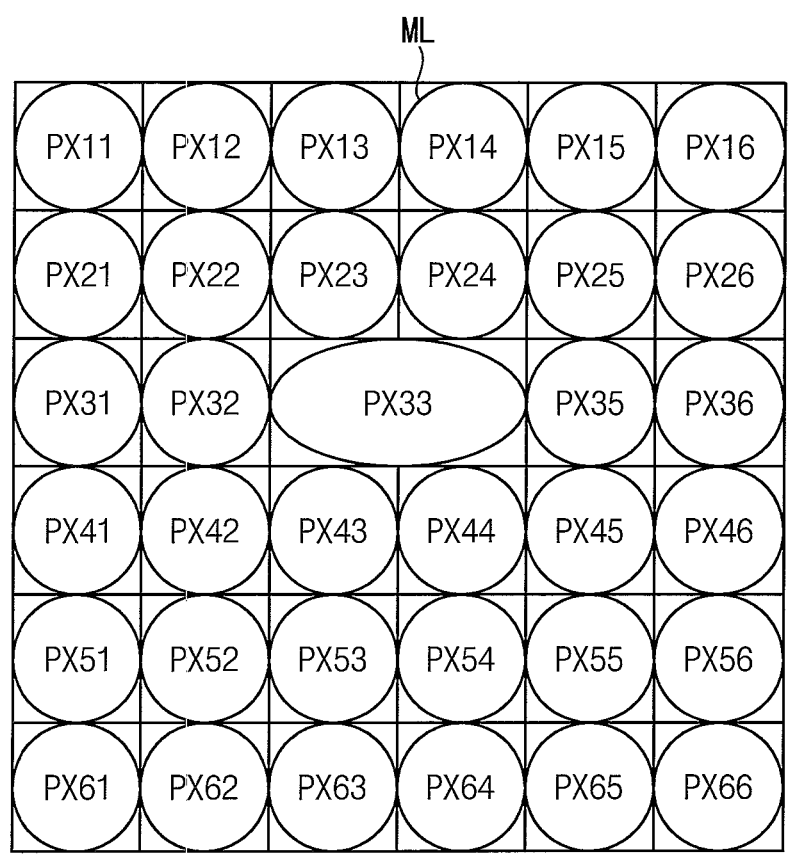
FIGS. 5A, 5B and 5C are diagrams illustrating an example of a pixel array included in an auto-focus image sensor of FIG. 3.
Figure 5A:
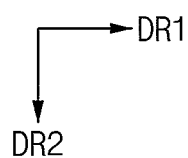
Figure 5B:
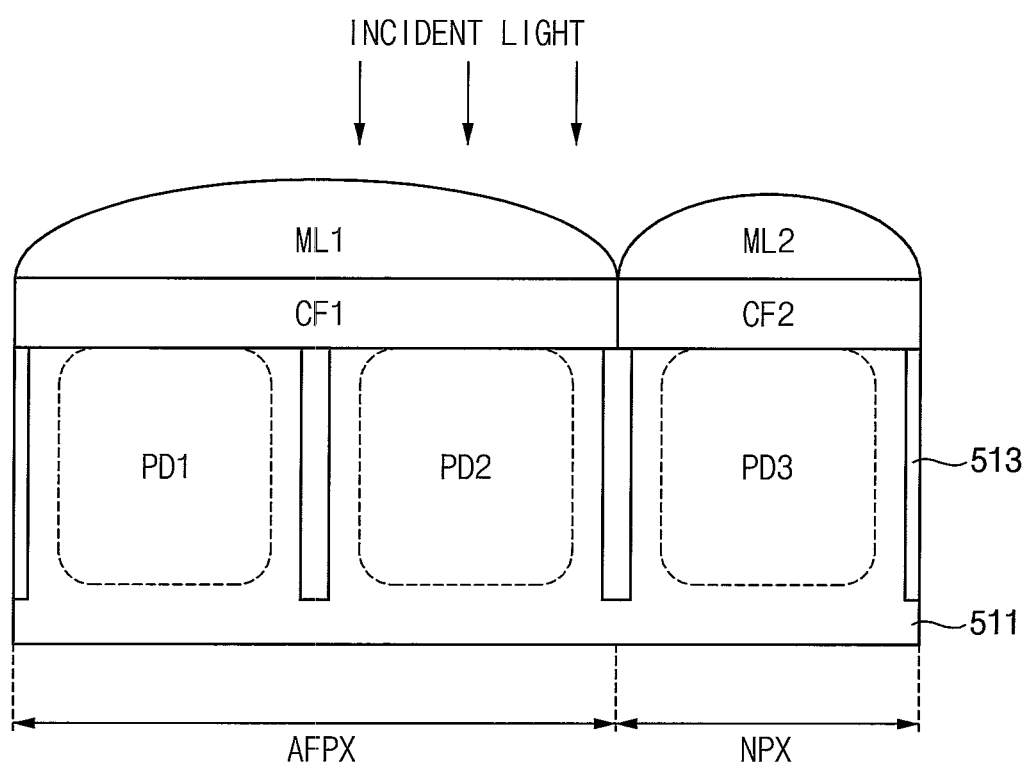
Figure 5C:
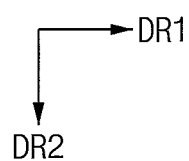

FIGS. 5A, 5B and 5C are diagrams illustrating an example of a pixel array included in an auto-focus image sensor of FIG. 3.

FIG. 5A is a plan view of an example of a pixel array included in an auto-focus image sensor. FIG. 5B is a cross-sectional view of an example of pixels included in a pixel array included in an auto-focus image sensor. FIG. 5C is a plan view of an example of a color filter array included in the pixel array of FIG. 5A.

Referring to FIG. 5A, a pixel array 512 included in an auto-focus image sensor may include a plurality of pixels PX11, PX12, PX13, PX14, PX15, PX16, PX21, PX22, PX23, PX24, PX25, PX26, PX31, PX32, PX33, PX35, PX36, PX41, PX42, PX43, PX44, PX45, PX46, PX51, PX52, PX53, PX54, PX55, PX56, PX61, PX62, PX63, PX64, PX65 and PX66. The pixel array may be repeated in this manner hundreds, thousands, or more times to be arranged in a larger array that forms the image sensor.

As described above, the plurality of pixels PX11 through PX16, PX21 through PX26, PX31 through PX33, PX35, PX36, PX41 through PX46, PX51 through PX56, and PX61 through PX66 may include first pixels that detect a phase difference and second pixels that detect an image. The first pixels may be referred to as auto-focus (AF) pixels, and the second pixels may be referred to as normal pixels, or image pixels. In the pixel array 512 according to example embodiments, the AF pixels for obtaining AF information and the normal pixels may be disposed in one pixel array 512. In an example of FIG. 5A, the pixel PX33 may be the AF pixel, and the remaining pixels PX11 through PX16, PX21 through PX26, PX31, PX32, PX35, PX36, PX41 through PX46, PX51 through PX56, and PX61 through PX66 may be normal pixels.

Micro lenses ML may be disposed on the plurality of pixels PX11 through PX16, PX21 through PX26, PX31 through PX33, PX35, PX36, PX41 through PX46, PX51 through PX56, and PX61 through PX66. A size of the micro lens of the AF pixel (e.g., the pixel PX33) may be larger than a size of the micro lens of the normal pixel (e.g., the pixel PX35).

Although FIG. 5A illustrates an example where six pixels are disposed in the pixel array 512 in a first direction DR1, six pixels are disposed in the pixel array 512 in a second direction DR2 crossing (e.g., substantially perpendicular to) the first direction DR1, and the pixel array 512 includes one AF pixel and thirty four normal pixels, example embodiments are not limited thereto. The size of the pixel array and the number of the pixels may be changed according to example embodiments.

Referring to FIG. 5B, a first pixel (or AF pixel) AFPX may include a first photoelectric conversion region PD1, a second photoelectric conversion region PD2, a first color filter CF1 and a first micro lens ML1. For example, the first pixel AFPX may correspond to the pixel PX33 in FIG. 5A.

The first and second photoelectric conversion regions PD1 and PD2 may be formed in a substrate 511. The first color filter CF1 may be formed on the first and second photoelectric conversion regions PD1 and PD2 (e.g., along a third direction DR3 crossing (e.g., substantially perpendicular to) the first and second directions DR1 and DR2), and may be shared by the first and second photoelectric conversion regions PD1 and PD2. In some example embodiments, the first color filter CF1 may include two color filters that have the same color and formed on the first and second photoelectric conversion regions PD1 and PD2, respectively. The first micro lens ML1 may be formed on the first color filter CF1, and may be shared by the first and second photoelectric conversion regions PD1 and PD2.

A second pixel (or normal pixel) NPX may include a third photoelectric conversion region PD3, a second color filter CF2 and a second micro lens ML2. For example, the second pixel NPX may correspond to the pixel PX35 in FIG. 5A.

The third photoelectric conversion region PD3 may be formed in the substrate 511. The second color filter CF2 may be formed on the third photoelectric conversion region PD3. The second micro lens ML2 may be formed on the second color filter CF2.

In some example embodiments, the first, second and third photoelectric conversion regions PD1, PD2 and PD3 have the same size (e.g., the same area in a plan view or on a plane). Thus, a size (e.g., an area in a plan view) of the first micro lens ML1 shared by the first and second photoelectric conversion regions PD1 and PD2 may be larger than a size of the second micro lens ML2. For example, the size of the first micro lens ML1 may be about twice the size of the second micro lens ML2. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

The photoelectric conversion regions PD1, PD2 and PD3 may correspond to the photoelectric conversion unit 610 in FIG. 4, and may perform a photoelectric conversion operation based on incident light to generate photo-charges. For example, each of the photoelectric conversion regions PD1, PD2 and PD3 may generate electron-hole pairs in response to the incident light, and may collect the electrons and/or the holes of the electron-hole pairs. The photoelectric conversion regions PD1, PD2 and PD3 may include a photo diode, a photo transistor, a photo gate, a pinned photo diode (PPD) and/or a combination thereof.

In some example embodiments, the color filters CF1 and CF2 may include a red filter, a green filter and/or a blue filter. In other example embodiments, the color filters CF1 and CF2 may include a yellow filter, a magenta filter and/or a cyan filter. The color filters CF1 and CF2 may further include a white filter.

The micro lenses ML1 and ML2 may adjust a path of light entering the micro lenses ML1 and ML2 such that the light is focused on corresponding photoelectric conversion regions PD1, PD2 and PD3.

In some example embodiments, the micro lenses ML1 and ML2 may form a micro lens array, and the color filters CF1 and CF2 may form a color filter array.

In some example embodiments, the pixel array may further include a device isolation region 513 formed between the photoelectric conversion regions PD1, PD2 and PD3. The device isolation region 513 may formed or disposed in the substrate 511, may extend substantially vertically from a surface of the substrate 511 in the third direction DR3 so as to penetrate the substrate 511 to isolate or separate the photoelectric conversion regions PD1, PD2 and PD3 from each other, and may include an insulative material. The device isolation region 513 may have a mesh structure in a plan view.

In some example embodiments, the auto-focus image sensor may be a frontside illuminated image sensor (FIS) that operates in response to the incident light passing through a front surface of the substrate 511 or a backside illuminated image sensor (BIS) that operates in response to incident light passing through the back surface of the substrate 511. Although not illustrated in detail, gate electrodes and wirings for forming the signal generation unit 612 in FIG. 4 may be disposed on the front or back surface of the substrate 511.

Referring to FIG. 5C, a color filter array CFA1 included in the pixel array 512 may include a red filter R, a green filter G, a blue filter B and a white filter W. In other words, the color filter array CFA1 may have an RGBW pattern.

The pixels PX32, PX36, PX41 and PX45 may include the red filter R. The pixels PX12, PX16, PX21, PX25, PX33, PX43, PX52, PX56, PX61 and PX65 may include the green filter G. The pixels PX14, PX23, PX54 and PX63 may include the blue filter B. The pixels PX11, PX13, PX15, PX22, PX24, PX26, PX31, PX35, PX42, PX44, PX46, PX51, PX53, PX55, PX62, PX64 and PX66 may include the white filter W. As a result, in some embodiments, the AF pixels and the normal pixels included in the pixel array 512 may have the same color filter arrangement structure.

Figure 6A:
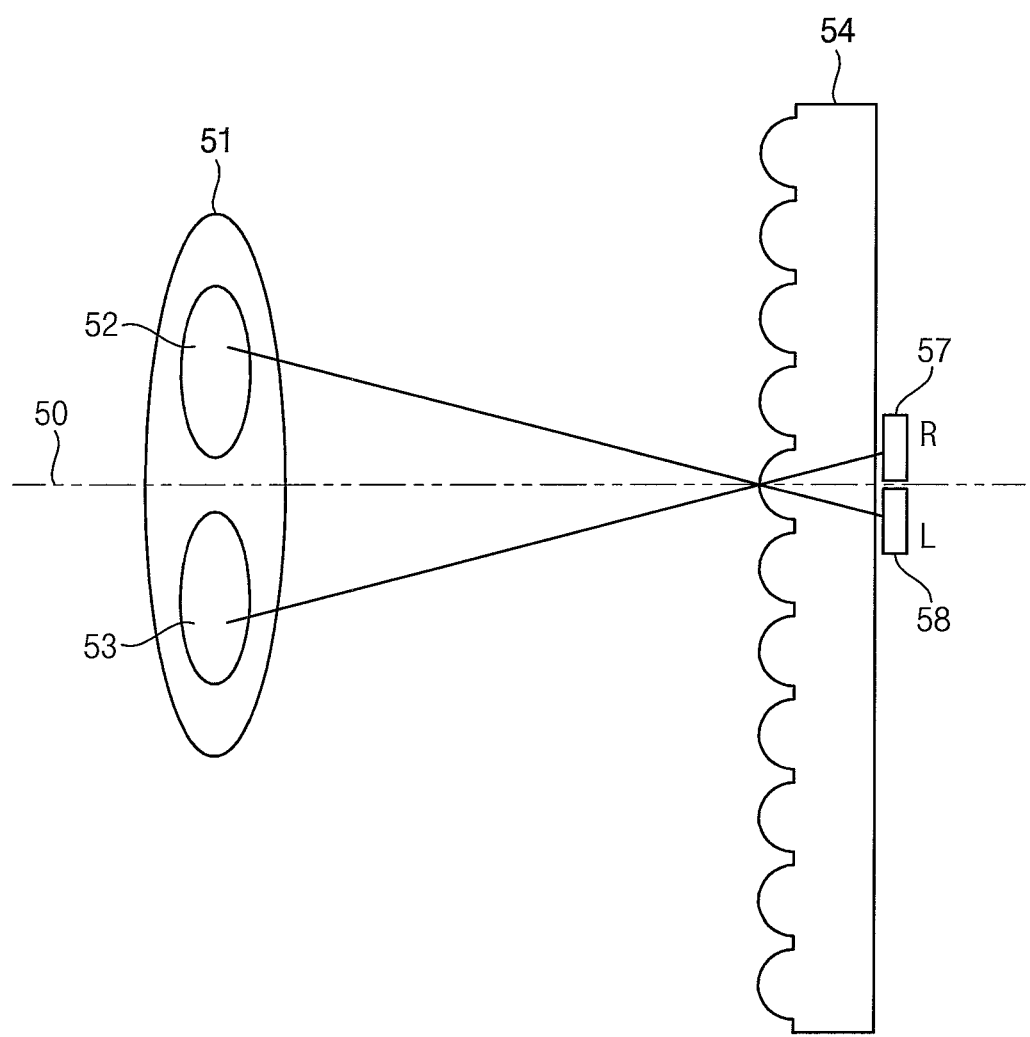
FIGS. 6A, 6B and 6C are diagrams for describing an example of performing auto-focus using an auto-focus image sensor of FIG. 3.
Figure 6B:
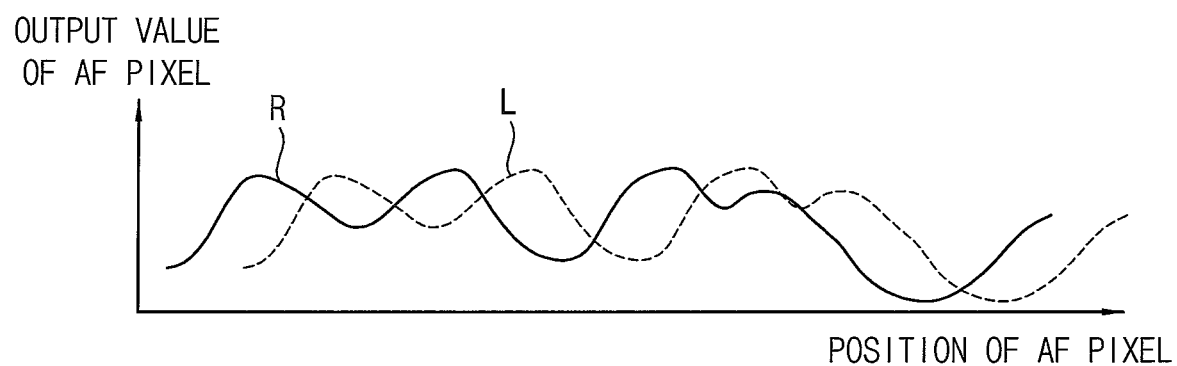
Figure 6C:
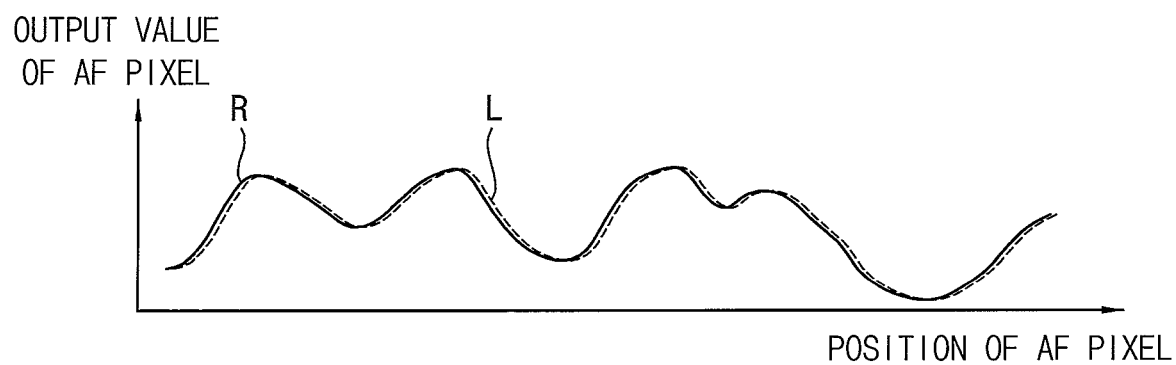

FIGS. 6A, 6B and 6C are diagrams for describing an example of performing auto-focus using an auto-focus image sensor of FIG. 3.

Referring to FIGS. 6A, 6B and 6C, light (or incident light) of an object that has passed through a lens 51 of an image capturing device (e.g., a camera) including an auto-focus image sensor passes through a micro lens array 54 including a plurality of micro lenses (e.g., the micro lens ML1 in FIG. 5B) so as to be introduced to a first AF pixel (R) 57 and a second AF pixel (L) 58. The light inputted from a pupil 52 disposed above a light axis 50 of the lens 51 is induced to the second AF pixel 58, and the light inputted from a pupil 53 disposed under the light axis 50 of the lens 51 is induced to the first AF pixel 57.

Continuous pixel outputs of the first and second AF pixels 57 and 58 according to positions of the first and second AF pixels 57 and 58 are illustrated in FIGS. 6B and 6C. In each of FIGS. 6B and 6C, a horizontal axis represents a position of each of the first and second AF pixels 57 and 58, and a vertical axis represents an output value of each of the first and second AF pixels 57 and 58. Referring to FIGS. 6B and 6C, a shape of the continuous output value of the first AF pixel 57 is substantially the same as that of the second AF pixel 58. However, positions (e.g., phases) of the output values of the first and the second AF pixels 57 and 58 may be different from each other as shown in FIG. 6B. This is because positions at which an image is formed based on the light provided from the pupils 52 and 53 of the lens 51 are different from each other. Thus, if the lens 51 is out of focus, the phases of the output values of the first and the second AF pixels 57 and 58 are different as illustrated in FIG. 6B. If the lens 51 is in focus, the image is formed at the same position as illustrated in FIG. 6C.

In addition, a direction of a focus difference may be determined based on a difference between the phases of the output values of the first and the second AF pixels 57 and 58. A front-focusing state means that the lens 51 focuses in front of the object. In the front-focusing state, the phase of the output value of the first AF pixel 57 is left-shifted from a phase of a focused state, and the phase of the output value of the second AF pixel 58 is right-shifted from the phase of the focused state. On the other hand, a back-focusing state means that the lens 51 focuses on a back of the object. In the back-focusing state, the phase of the output value of the first AF pixel 57 is right-shifted from the phase of the focused state, and the phase of the output value of the second AF pixel 58 is left-shifted from the phase of the focused state. The shifted amount between the phases of the output values of the first and the second AF pixels 57 and 58 may be used to obtain a deviation amount between focuses.

FIGS. 7A, 7B, 7C, 8A, 8B and 9 are diagrams for describing an operation of an image processing device according to example embodiments. FIGS. 7A, 7B, 7C, 8A, 8B and 9 illustrate an operation when a pixel array of an auto-focus image sensor has a structure illustrated in FIGS. 5A, 5B and 5C.

Referring to FIG. 7A, first image frame data FDAT11 that is provided from the auto-focus image sensor 500 and corresponds to one image frame may include a plurality of pixel values PV11W, PV12G, PV13W, PV14B, PV15W, PV16G, PV21G, PV22W, PV23B, PV24W, PV25G, PV26W, PV31W, PV32R, PV33G, PV34G, PV35W, PV36R, PV41R, PV42W, PV43G, PV44W, PV45R, PV46W, PV51W, PV52G, PV53W, PV54B, PV55W, PV56G, PV61G, PV62W, PV63B, PV64W, PV65G and PV66W that are obtained from the plurality of pixels PX11 through PX16, PX21 through PX26, PX31 through PX33, PX35, PX36, PX41 through PX46, PX51 through PX56, and PX61 through PX66.

The pixel values PV32R, PV36R, PV41R, PV45R that are obtained from the pixels PX32, PX36, PX41 and PX45 including the red filter R may correspond to a red color. The pixel values PV12G, PV16G, PV21G, PV25G, PV33G, PV34G, PV43G, PV52G, PV56G, PV61G and PV65G that are obtained from the pixels PX12, PX16, PX21, PX25, PX33, PX43, PX52, PX56, PX61 and PX65 including the green filter G may correspond to a green color. The pixel values PV14B, PV23B, PV54B and PV63B that are obtained from the pixels PX14, PX23, PX54 and PX63 including the blue filter B may correspond to a blue color. The pixel values PV11W, PV13W, PV15W, PV22W, PV24W, PV26W, PV31W, PV35W, PV42W, PV44W, PV46W, PV51W, PV53W, PV55W, PV62W, PV64W and PV66W that are obtained from the pixels PX11, PX13, PX15, PX22, PX24, PX26, PX31, PX35, PX42, PX44, PX46, PX51, PX53, PX55, PX62, PX64 and PX66 including the white filter W may correspond to a white color. One pixel value may be generated from one photoelectric conversion region, and thus two pixel values PV33G and PV34G may be obtained from the pixel PX33, which is the AF pixel.

In some embodiments, the color filters disposed on the AF pixels are not used to form colors (e.g., to generate pixel values corresponding to a specific color), and the color filters may be disposed on the AF pixels only for convenience of a process of manufacturing the color filter array. Thus, the color filters disposed on the AF pixels may be described as dummy color filters, and may not correspond to the color pattern used for the remaining pixels of the pixel array. In addition, the color filter having a single color may be disposed on one AF pixel for the accuracy of AF information. However, it may be useful for the output of the color filter array, for the purpose of processing image pixels, to have the same color filter arrangement structure as when an image pixel array without AF pixels is used, for the accuracy of image information. Thus it may be beneficial to correct the pixel values PV33G, PV34G, PV43G and PV44W to correspond to a WGGW pattern, e.g., to change the pixel value PV33G corresponding to the green color to correspond to the white color, for image processing purposes other than autofocusing.

Figure 7B:
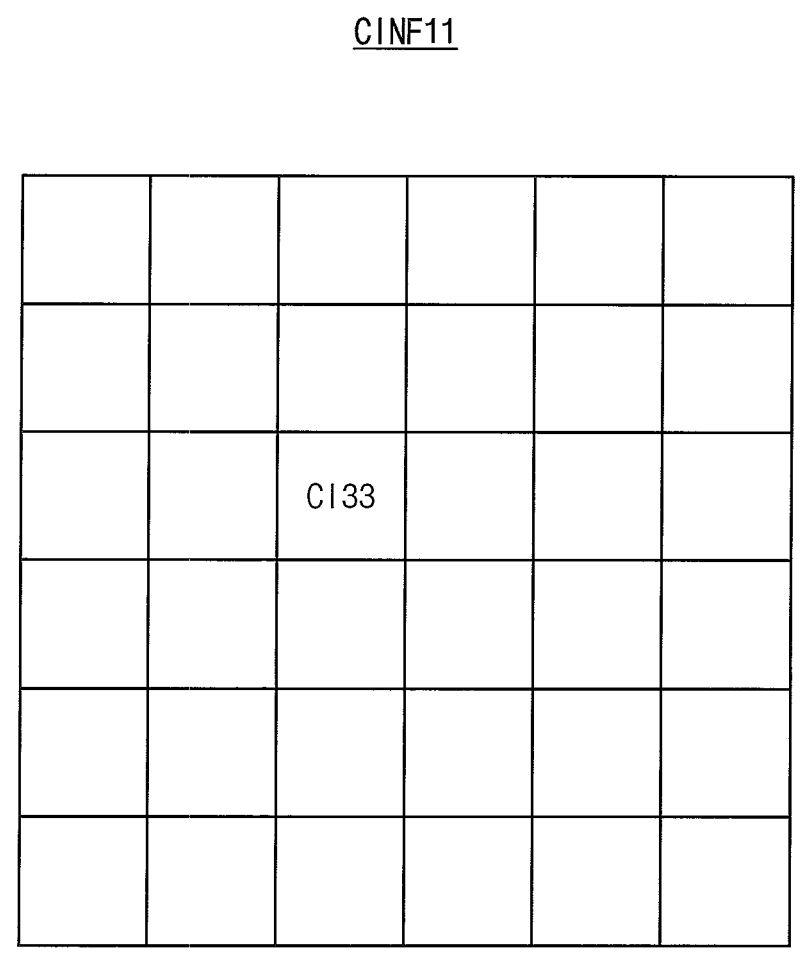

Referring to FIG. 7B, first correction information CINF11 that is stored in the memory 120 and is used for correcting the first image frame data FDAT11 may include correction data CI33 that is used for correcting the pixel value PV33G. For example, the pixel value PV33G may be corrected to allow that pixel to be used both for autofocusing and as an image pixel.

In some example embodiments, the correction data CI33 may include a gain (or gain value) that is used for converting the pixel value PV33G corresponding to the green color into a corrected pixel value (e.g., a corrected pixel value PV33Wc in FIG. 7C) corresponding to the white color, and position data that represents a position (or location) of the pixel PX33. Where a plurality of pixel data is to be corrected for a plurality of pixels, the correction data may include a plurality of gains and a plurality of respective position data. For example, different pixels can have color corrected using the same or different gains within the same image sensor.

For example, a following Equation 1 may be used for converting the pixel value PV33G corresponding to the green color into the corrected pixel value PV33Wc corresponding to the white color.

$$WV=\alpha1\cdot GV+\beta1\cdot RV+\gamma1\cdot BV \quad \text{[Equation 1]}$$

In the Equation 1, "WV" represents the corrected pixel value PV33Wc that corresponds to the white color and a result of the correction operation, "GV" represents the pixel value PV33G that corresponds to the green color and a target of the correction operation, "RV" represents a pixel value that is used for the correction operation, is obtained from a pixel adjacent to the pixel PX33, and corresponds to the red color, and "BV" represents a pixel value that is used for the correction operation, is obtained from a pixel adjacent to the pixel PX33, and corresponds to the blue color. Values $\alpha1$, $\beta1$ and $\gamma1$ represent the gain, respectively. Therefore, a plurality of gains and a plurality of position data can be used to correct the pixel values.

When the correction operation is performed based on the Equation 1, not only the pixel value PV33G obtained from the pixel PX33 but also adjacent pixel values obtained from adjacent pixels adjacent to the pixel PX33 may be used together to generate the corrected pixel value PV33Wc. For example, the pixel value PV32R that is obtained from the pixel PX32 adjacent to the pixel PX33 and corresponds to the red color may be used as the value "RV" in the Equation 1, and the pixel value PV23B that is obtained from the pixel PX23 adjacent to the pixel PX33 and corresponds to the blue color may be used as the value "BV" in the Equation 1. In some example embodiments, the pixel value PV34G that is obtained from the pixel PX34 adjacent to the pixel PX33 and corresponds to the green color and/or the pixel value PV43G that is obtained from the pixel PX43 adjacent to the pixel PX33 and corresponds to the green color may be additionally used as the adjacent pixel values.

For example, when a position of the pixel PX11 is defined as (1,1) and a position of the pixel PX66 is defined as (6,6), the position data that represents the position of the pixel PX33 may include a position value corresponding to (3,3), which is a position of a photoelectric conversion region generating the pixel value PV33G (e.g. the target of the correction operation) to be corrected among the pixel values PV33G and PV34G obtained from the pixel PX33.

In other example embodiments, the correction data CI33 may include the gain and the position data, and may further include an offset (or offset value) that is used for converting the pixel value PV33G corresponding to the green color into the corrected pixel value PV33Wc corresponding to the white color.

For example, a following Equation 2 may be used for converting the pixel value PV33G corresponding to the green color into the corrected pixel value PV33Wc corresponding to the white color.

$$WV=\alpha2\cdot GV+\beta2 \quad \text{[Equation 2]}$$

In the Equation 2, "WV" represents the corrected pixel value PV33Wc that corresponds to the white color and a result of the correction operation, and "GV" represents the pixel value PV33G that corresponds to the green color and a target of the correction operation. A value $\alpha2$ represents the gain, and a value $\beta2$ represents the offset.

When the correction operation is performed based on the Equation 2, only the pixel value PV33G obtained from the pixel PX33 is used to generate the corrected pixel value PV33Wc.

In still other example embodiments, the correction data CI33 may include the gain, the offset and the position data, and may further include at least one additional data for correcting the pixel value.

In FIG. 7B, a portion illustrated by a blank space, e.g., a portion in which correction data is not included or described, may be a region without the correction data, e.g., a region in which the correction operation is not necessary or required or used. The first image frame data FDAT11 may include the pixel values for all pixels as illustrated in FIG. 7A, however, the first correction information CINF11 may include only the correction data CI33 for the pixel employing the correction operation. Thus, a size (or the amount of data) of the first correction information CINF11 may be smaller than a size of the first image frame data FDAT11.

Referring to FIG. 7C, first corrected image frame data CFDAT11 may be generated by correcting the first image frame data FDAT11 of FIG. 7A based on the first correction information CINF11 of FIG. 7B. For example, the first corrected image frame data CFDAT11 may be generated by correcting (or converting) the pixel value PV33G corresponding to the green color to the corrected pixel value PV33Wc corresponding to the white color based on the correction data CI33.

The remaining pixel values PV11W, PV12G, PV13W, PV14B, PV15W, PV16G, PV21G, PV22W, PV23B, PV24W, PV25G, PV26W, PV31W, PV32R, PV34G, PV35W, PV36R, PV41R, PV42W, PV43G, PV44W, PV45R, PV46W, PV51W, PV52G, PV53W, PV54B, PV55W, PV56G, PV61G, PV62W, PV63B, PV64W, PV65G and PV66W included in the first corrected image frame data CFDAT11 may be substantially the same as the pixel values PV11W, PV12G, PV13W, PV14B, PV15W, PV16G, PV21G, PV22W, PV23B, PV24W, PV25G, PV26W, PV31W, PV32R, PV34G, PV35W, PV36R, PV41R, PV42W, PV43G, PV44W, PV45R, PV46W, PV51W, PV52G, PV53W, PV54B, PV55W, PV56G, PV61G, PV62W, PV63B, PV64W, PV65G and PV66W included in the first image frame data FDAT11, respectively. The pixel values shown in FIG. 7C may therefore represent data for an image (or portion of an image) sensed by the pixels of FIGS. 5A-5C.

Figure 8A:
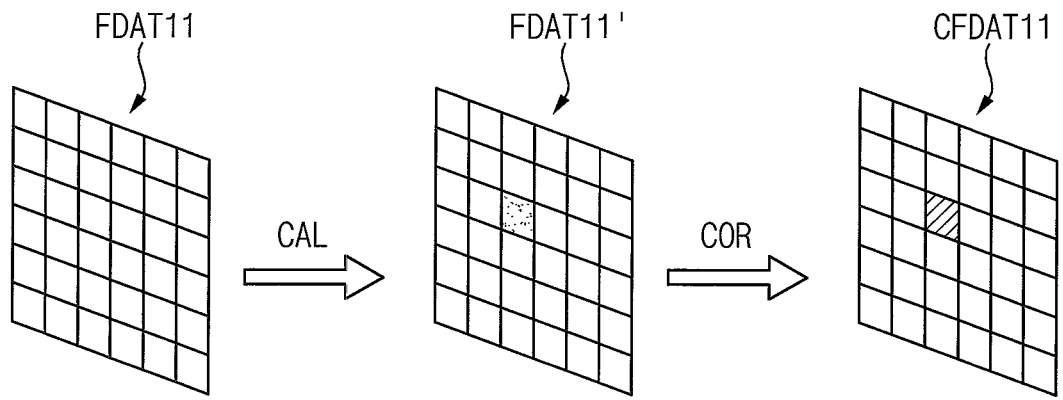

Referring to FIG. 8A, in a conventional operation, a calibration operation CAL for generating correction information is performed based on the first image frame data FDAT11 to generate calibrated first image frame data FDAT11', and the first corrected image frame data CFDAT11 is generated by performing a correction operation COR based on the calibrated first image frame data FDAT11'. In this example, two operations including the calibration operation CAL and the correction operation COR are performed, data corresponding to one image frame are calculated and processed for each operation, and thus the amount of calculation, calculation time, power consumption, etc. are relatively large.

Figure 8B:
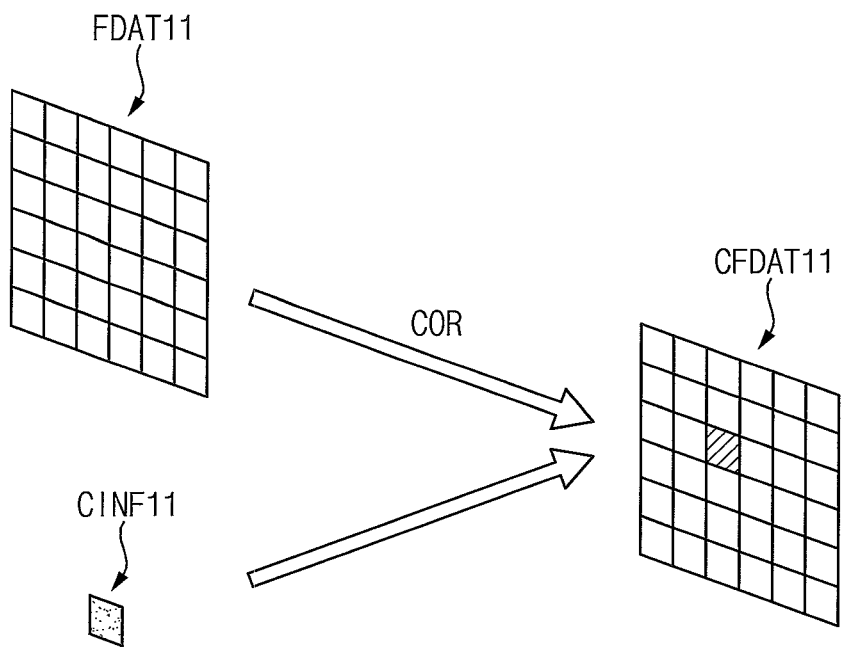

Referring to FIG. 8B, in an operation according to example embodiments, the first correction information CINF11 used for a correction operation COR (e.g., as described for example in FIGS. 7A-7C) may be obtained and stored in advance, the stored first correction information CINF11 may be loaded when the first image frame data FDAT11 is received, and the first corrected image frame data CFDAT11 may be generated by performing the correction operation COR based on the loaded first correction information CINF11. In this example, only one operation including the correction operation COR is performed, a relatively small size of the first correction information CINF11 is used during the correction operation COR, and thus the amount of calculation, calculation time, power consumption, etc. may be reduced.

Figure 9:
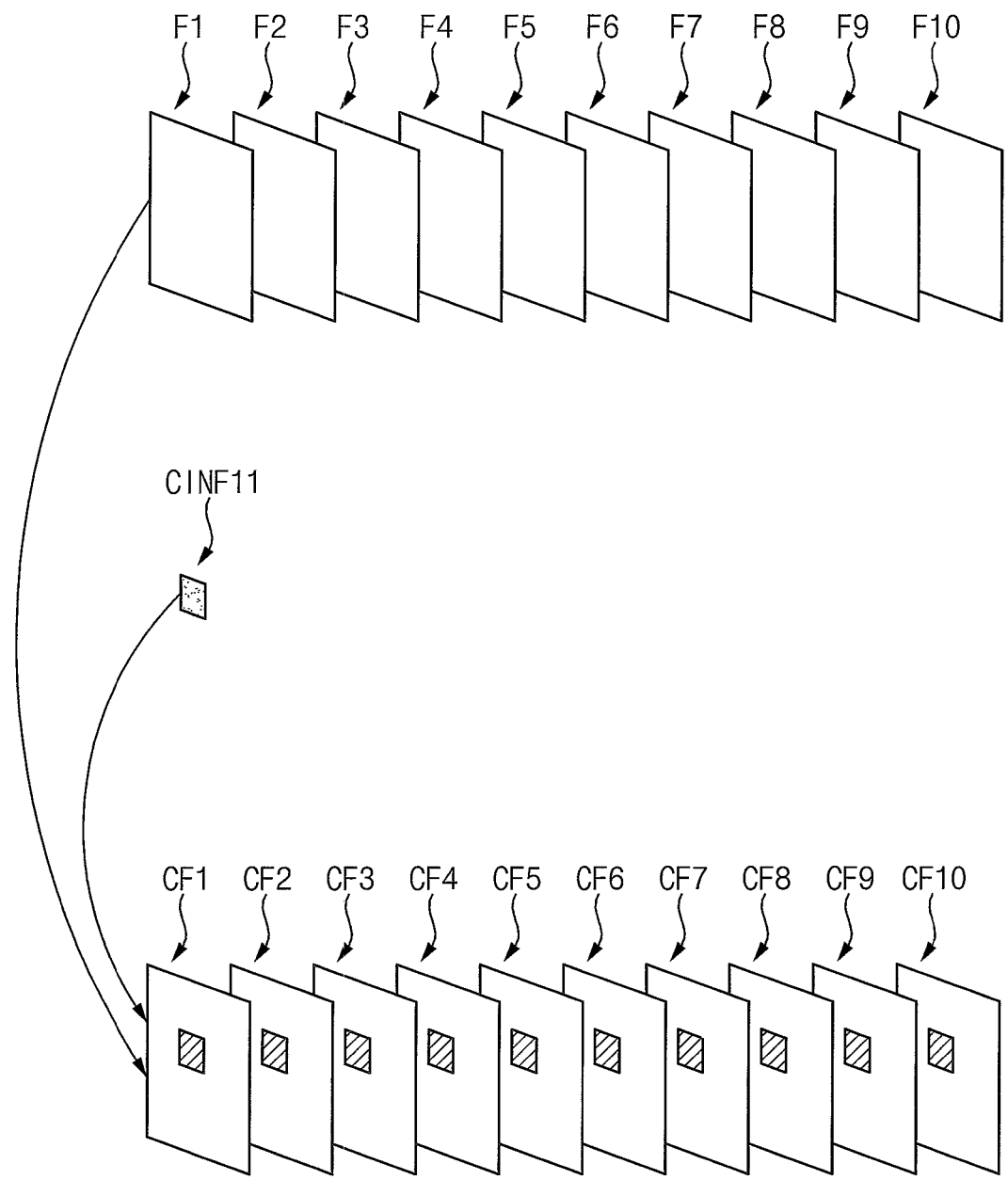

Referring to FIG. 9, an example in which a plurality of corrected image frame data CF1, CF2, CF3, CF4, CF5, CF6, CF7, CF8, CF9 and CF10 are sequentially generated when a plurality of image frame data F1, F2, F3, F4, F5, F6, F7, F8, F9 and F10 are sequentially received from the auto-focus image sensor 500 is illustrated.

In an example of FIG. 9, each of the plurality of image frame data F1 through F10 may correspond to the first image frame data FDAT11 in FIGS. 7A and 8B, the first correction information CINF11 may correspond to the first correction information CINF11 in FIGS. 7B and 8B, and each of the plurality of corrected image frame data CF1 through CF10 may correspond to the first corrected image frame data CFDAT11 in FIGS. 7C and 8B.

Similar to that described with reference to FIG. 8B, even when the plurality of image frame data F1 through F10 are sequentially received, the first correction information CINF11 stored in advance may be loaded, and the plurality of corrected image frame data CF1 through CF10 may be sequentially generated by sequentially performing the correction operation COR based on the loaded first correction information CINF11. Thus, as compared to the conventional operation in which the calibration operation CAL and the correction operation COR are performed for each frame (or every frame), the amount of calculation, calculation time, power consumption, etc. may be reduced.

Although FIG. 9 illustrates an example including ten image frame data F1 through F10 and ten corrected image frame data CF1 through CF10, example embodiments are not limited thereto. For example, when first through N-th image frame data are sequentially received from the auto-focus image sensor 500, where N is a natural number greater than or equal to two, first through N-th corrected image frame data may be sequentially generated by sequentially correcting the first through N-th image frame data based on the first correction information CINF11.

Although example embodiments are described with reference to FIGS. 5A, 5B, 5C, 6A, 6B, 6C, 7A, 7B, 7C, 8A, 8B and 9 based on a specific structure of the pixel array, a specific structure of the pixels and specific colors, example embodiments are not limited thereto. For example, example embodiments may be applied or employed when pixel values are generated from an AF pixel in which one micro lens and one color filter are shared by two or more photoelectric conversion regions and when at least one pixel value corresponding to an arbitrary color is corrected or converted to correspond to an arbitrary other color.

Figure 10:
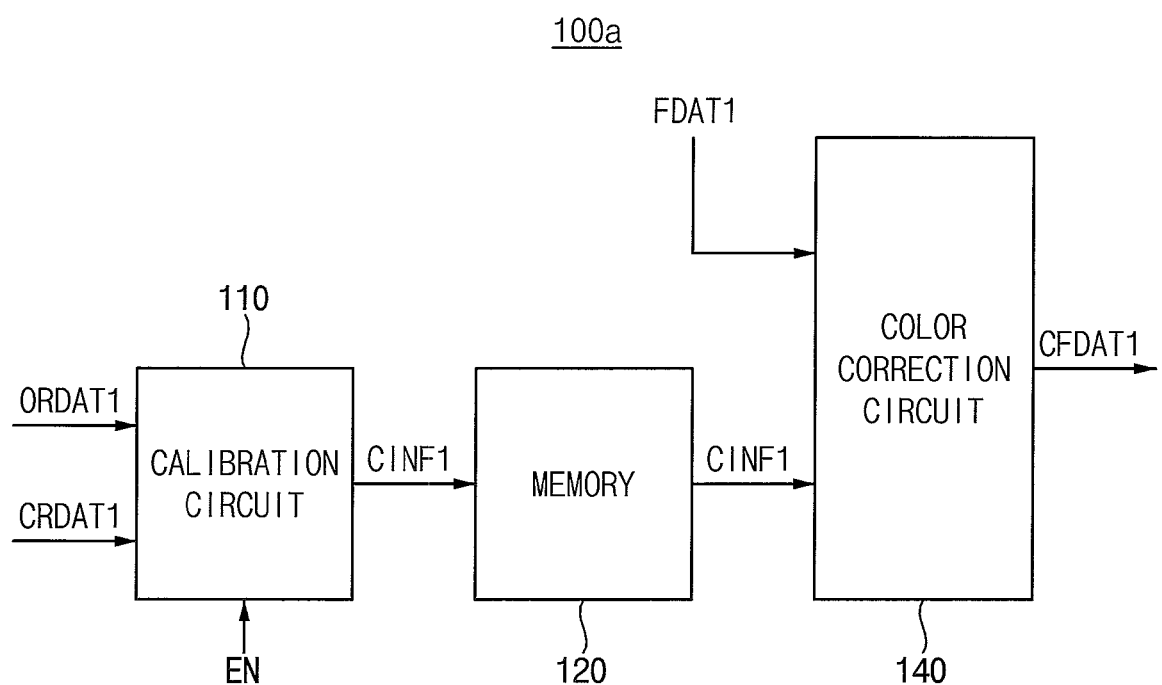
FIG. 10 is a block diagram illustrating an image processing device according to example embodiments.

FIG. 10 is a block diagram illustrating an image processing device according to example embodiments. The descriptions repeated with FIG. 1 will be omitted.

Referring to FIG. 10, an image processing device 100a includes a memory 120 and a color correction circuit 140. The image processing device 100a further includes a calibration circuit 110.

The image processing device 100a may be substantially the same as the image processing device 100 of FIG. 1, except that the image processing device 100a further includes the calibration circuit 110.

The calibration circuit 110 may generate the first correction information CINF1 that is stored in the memory 120. For example, the calibration circuit 110 may generate the first correction information CINF1 based on first original image data ORDAT1 that corresponds to a reference pattern and first reference image frame data CRDAT1.

The reference pattern may represent a reference image for generating the first correction information CINF1 (e.g., the gain, the offset, etc. that are used for correcting the pixel value). For example, the reference pattern may be a uniform (or flat) image that corresponds to only one grayscale value, such as a white image or a green image. The reference pattern may include, for example, a specific pattern such as a stripe. In some embodiments, the first original image data ORDAT1 represents raw data of the reference pattern (e.g., data for a white image, or data for a green image), and the first reference image frame data CRDAT1 represents a frame image obtained by capturing the reference pattern by the auto-focus image sensor.

In some example embodiments, the calibration circuit 110 may generate and store the first correction information CINF1 in the memory 120 in advance before the auto-focus image sensor normally operates. Thus, the calibration circuit 110 may be referred to as a pre-processing unit.

In some example embodiments, the calibration circuit 110 may be disabled or deactivated while the auto-focus image sensor normally operates. For example, the calibration circuit 110 may be enabled or activated at an initial operation time of the image processing device 100a or during a process of manufacturing the image processing device 100a to generate the first correction information CINF1, and then may be disabled or deactivated and may not operate while the auto-focus image sensor normally operates. For example, the calibration circuit 110 may be enabled or disabled based on an enable signal EN.

Figure 11:
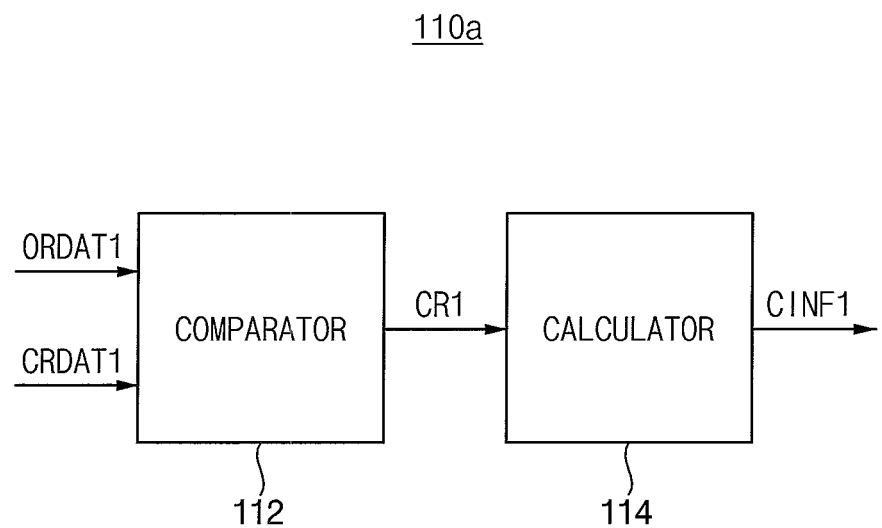
FIG. 11 is a block diagram illustrating an example of a calibration circuit included in an image processing device of FIG. 10.

FIG. 11 is a block diagram illustrating an example of a calibration circuit included in an image processing device of FIG. 10.

Referring to FIG. 11, a calibration circuit 110a may include a comparator 112 and a calculator 114. Each of the comparator 112 and calculator 114 may be a circuit, or may be implemented by computer program code executed by hardware.

The comparator 112 may receive the first original image data ORDAT1 corresponding to the reference pattern and the first reference image frame data CRDAT1 obtained by capturing the reference pattern by the auto-focus image sensor, and may compare the first original image data ORDAT1 with the first reference image frame data CRDAT1 to generate first comparison result data CR1.

The calculator 114 may calculate the first correction information CINF1 based on the first comparison result data CR1, which is a result of comparing the first original image data ORDAT1 with the first reference image frame data CRDAT1. For example, the calculator 114 may calculate a relationship between the first color corresponding to a target of the correction operation and the second color corresponding to a result of the image capture operation. For example, the calculator 114 may obtain the gain, the offset, etc. that are described with reference to the Equations 1 and 2 as a result of the calculation. For example, the first original image data ORDAT1 can correspond to a target color to achieve from color correction (e.g., white), and the first reference image frame data CRDAT1 can correspond to an actual color (e.g., green) received by an image sensor (e.g., by the AF pixels) when the target color is applied to the image sensor (e.g., the AF pixels). The gain, offset, etc., between that target color and actual color can be used later for color correction during operation.

Figure 12:
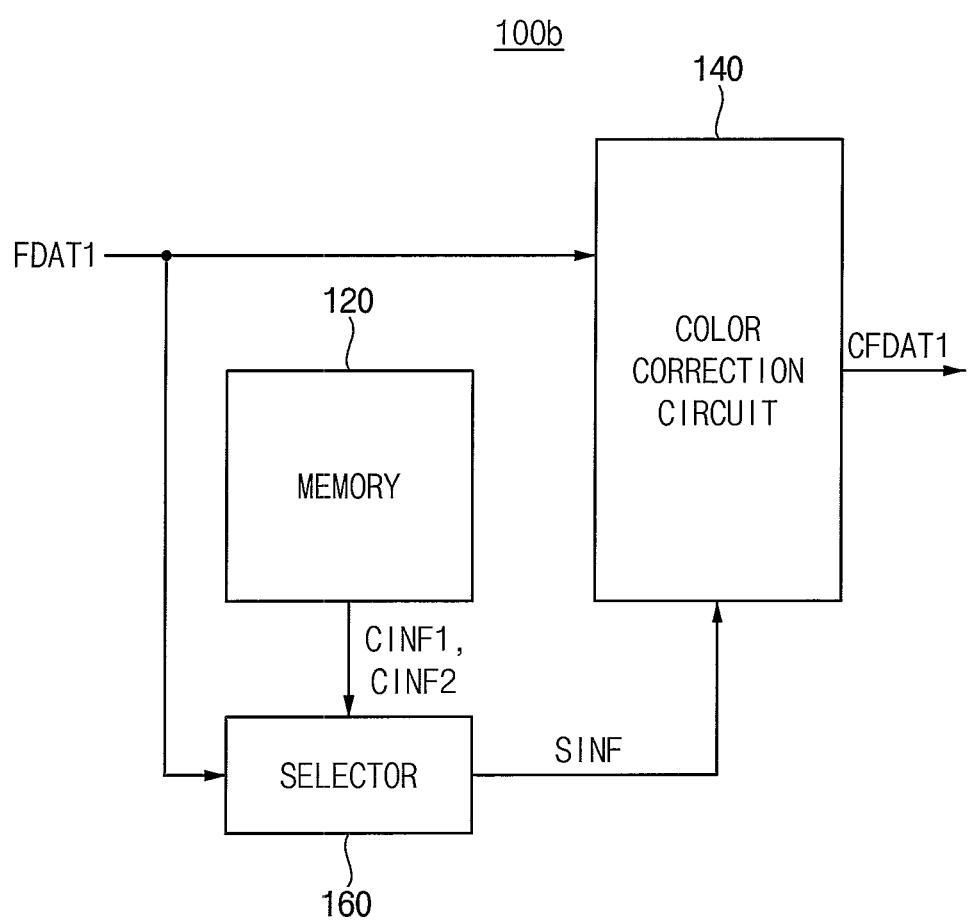
FIGS. 12 and 13 are block diagrams illustrating an image processing device according to example embodiments.
Figure 13:
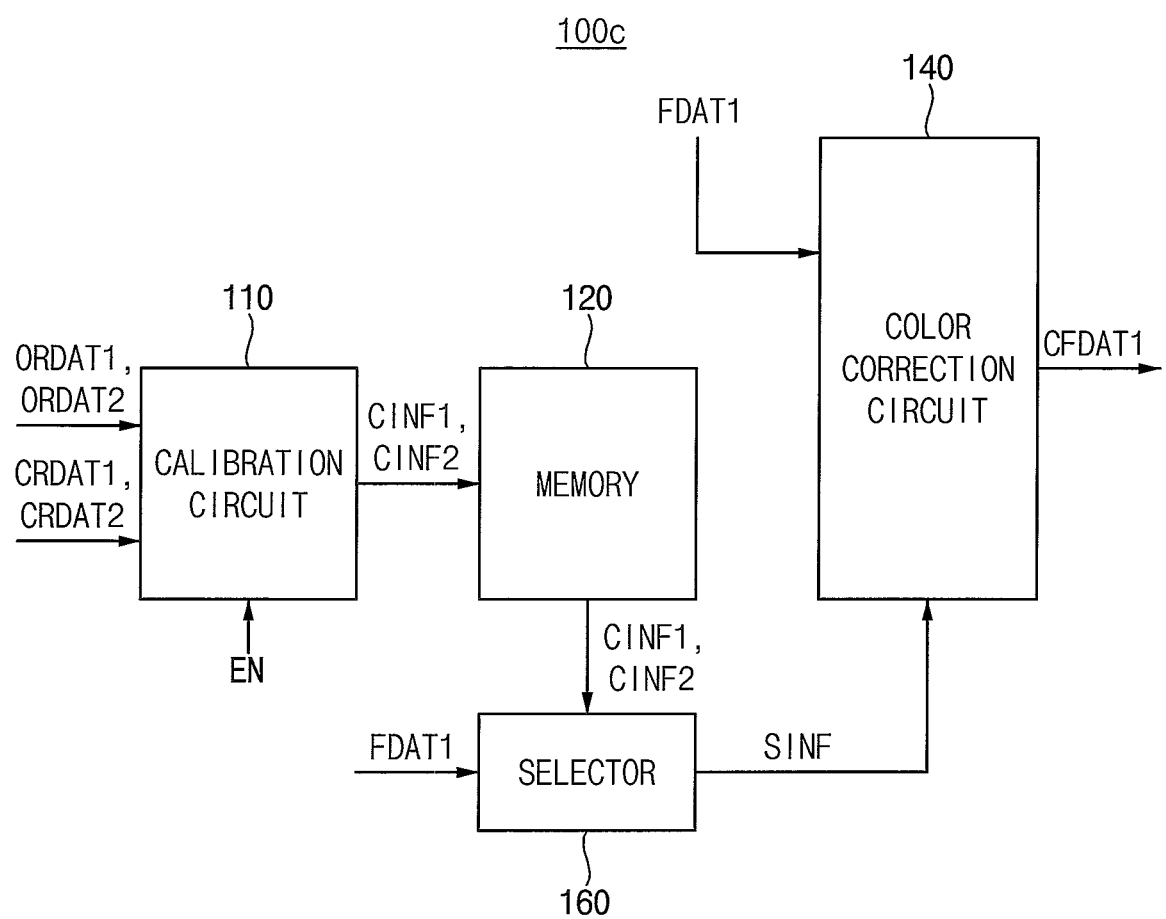

FIGS. 12 and 13 are block diagrams illustrating an image processing device according to example embodiments. The descriptions repeated with FIG. 1 will be omitted.

Referring to FIG. 12, an image processing device 100b includes a memory 120 and a color correction circuit 140. The image processing device 100b may further include a selector 160. The selector 160 may be a circuit, or may be implemented by computer program code executed by hardware.

The image processing device 100b may be substantially the same as the image processing device 100 of FIG. 1, except that the memory 120 further stores second correction information CINF2 and the image processing device 100b further includes the selector 160.

The memory 120 may store and output the second correction information CINF2. As with the first correction information CINF1, the second correction information CINF2 may be used for correcting the first pixel values corresponding to the first color among the plurality of pixel values that are received from the auto-focus image sensor, and may be used for correcting the first pixel values to correspond to the second color different from the first color. In addition, the second correction information CINF2 may have a value different from that of the first correction information CINF1.

In some example embodiments, the first and second correction information CINF1 and CINF2 may correspond to different color temperatures. For example, the first correction information CINF1 may correspond to a first color temperature, and the second correction information CINF2 may correspond to a second color temperature different from the first color temperature. However, example embodiments are not limited thereto, and the first and second correction information CINF1 and CINF2 may correspond to the other different parameters associated with or related to colors.

The selector 160 may select one of the first correction information CINF1 and the second correction information CINF2 based on the first image frame data FDAT1, and may output the selected correction information SINF. The color correction circuit 140 may generate the first corrected image frame data CFDAT1 by correcting the first image frame data FDAT1 based on the selected correction information SINF.

In some example embodiments, when the first and second correction information CINF1 and CINF2 correspond to the different color temperatures, the selector 160 may include a color temperature determiner. For example, the color temperature determiner may determine a color temperature of the first image frame data FDAT1, may select the first correction information CINF1 when the color temperature of the first image frame data FDAT1 matches or corresponds to the first color temperature, and may select the second correction information CINF2 when the color temperature of the first image frame data FDAT1 matches the second color temperature. For another example, when the color temperature of the first image frame data FDAT1 does not match both the first and second color temperatures, the color temperature determiner may select one of the first correction information CINF1 and the second correction information CINF2 that is closer to the color temperature of the first image frame data FDAT1.

Although FIG. 12 illustrates an example where the memory 120 stores two pieces of correction information CINF1 and CINF2 and the selector 160 selects one of two pieces of correction information CINF1 and CINF2, example embodiments are not limited thereto. For example, the memory 120 may store three or more correction information, and the selector 160 may select one of three or more pieces of correction information.

Referring to FIG. 13, an image processing device 100c includes a memory 120 and a color correction circuit 140. The image processing device 100c may further include a calibration circuit 110 and a selector 160.

The image processing device 100c may be substantially the same as the image processing device 100 of FIG. 1, except that the memory 120 further stores the second correction information CINF2 and the image processing device 100c further includes the calibration circuit 110 and the selector 160. The calibration circuit 110 may be similar to the calibration circuit 110 in FIG. 10. The memory 120 and the selector 160 may be substantially the same as the memory 120 and the selector 160 in FIG. 12, respectively.

The calibration circuit 110 may generate the first correction information CINF1 based on the first original image data ORDAT1 and the first reference image frame data CRDAT1, and may generate the second correction information CINF2 based on second original image data ORDAT2 and second reference image frame data CRDAT2. For example, when the first correction information CINF1 corresponds to the first color temperature, the first original image data ORDAT1 may represent the reference pattern corresponding to the first color temperature, and the first reference image frame data CRDAT1 may represent a frame image obtained by capturing the reference pattern corresponding to the first color temperature (or by capturing the reference pattern at the first color temperature). When the second correction information CINF2 corresponds to the second color temperature, the second original image data ORDAT2 may represent the reference pattern corresponding to the second color temperature, and the second reference image frame data CRDAT2 may represent a frame image obtained by capturing the reference pattern corresponding to the second color temperature (or by capturing the reference pattern at the second color temperature).

Figure 14:
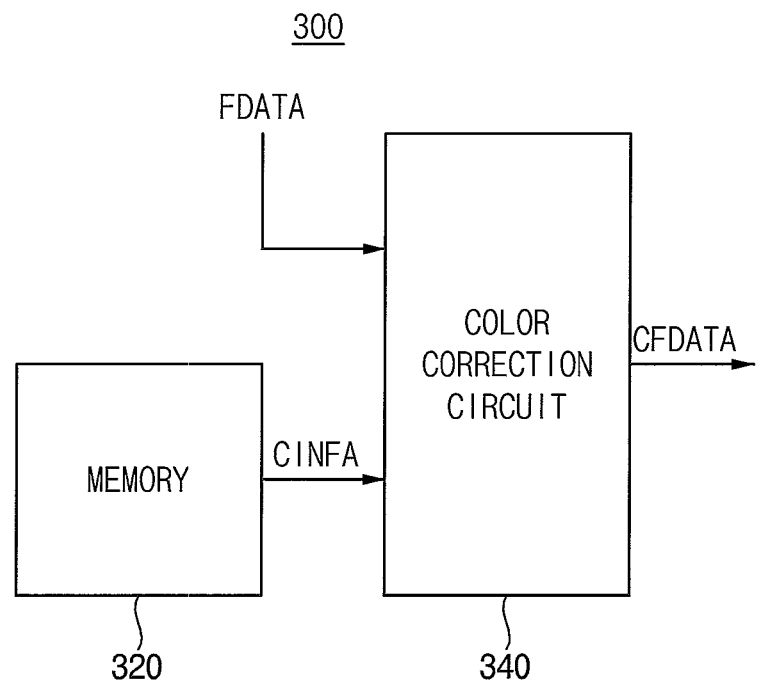
FIG. 14 is a block diagram illustrating an image processing device according to example embodiments.

FIG. 14 is a block diagram illustrating an image processing device according to example embodiments. The descriptions repeated with FIG. 1 will be omitted.

Referring to FIG. 14, an image processing device 300 includes a memory 320 and a color correction circuit 340.

The image processing device 300 may be substantially the same as the image processing device 100 of FIG. 1, except that the image processing device 300 performs a correction operation on an image frame received from an image sensor other than an auto-focus image sensor.

The memory 320 stores and outputs first correction information CINFA. The first correction information CINFA is used for correcting first pixel values among a plurality of pixel values that are received from an image sensor (e.g., an image sensor 420 in FIG. 15) located outside the image processing device 300. Unlike the auto-focus image sensor, the image sensor includes only a plurality of pixels (e.g., normal pixels) that detect an image, the first pixel values are obtained from first pixels among the plurality of pixels and correspond to a first color, and the first correction information CINFA is used for correcting the first pixel values to correspond to a second color different from the first color.

The color correction circuit 340 receives first image frame data FDATA including the plurality of pixel values from the image sensor, loads the first correction information CINFA from the memory 320, and generates first corrected image frame data CFDATA based on the first correction information CINFA and the first image frame data FDATA. For example, the color correction circuit 340 generates the first corrected image frame data CFDATA by correcting the first pixel values included in the first image frame data FDATA to correspond to the second color based on the first correction information CINFA.

The image processing device 300 according to example embodiments may correct or convert the pixel values of the pixels having a specific color and included in the image sensor into heterogeneous colors. The image processing device 300 may obtain the correction information CINFA for the correction operation in advance, may store the correction information CINFA in the memory 320 in advance, may load the correction information CINFA for each image frame, and may perform the correction operation based on the loaded correction information CINFA, instead of generating and calculating the correction information for the correction operation for each image frame. Accordingly, the amount of calculation, calculation time, power consumption, etc. for the correction operation may be reduced, and the image processing device 300 may have improved or enhanced performance.

In some example embodiments, the image processing device 300 may further include a calibration circuit as described with reference to FIG. 10, may further include a selector as described with reference to FIG. 12, and/or may further include both the calibration circuit and the selector as described with reference to FIG. 13. This correction operation can be performed on a single pixel or group of pixels within a particular matrix of pixels.

Figure 15:
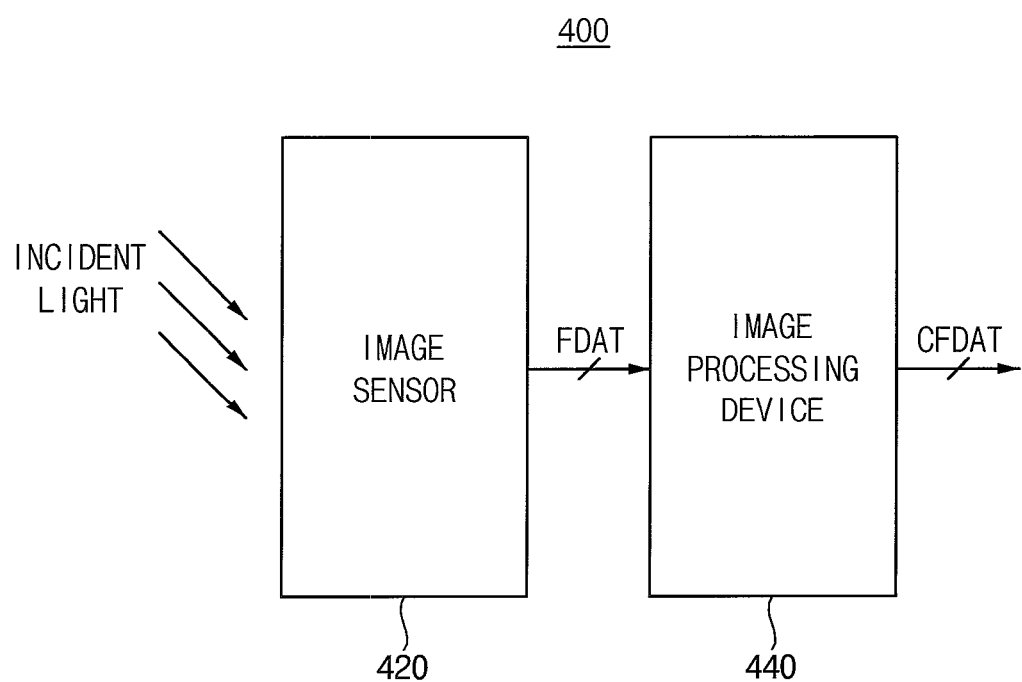
FIG. 15 is a block diagram illustrating an image processing system according to example embodiments.

FIG. 15 is a block diagram illustrating an image processing system according to example embodiments. The descriptions repeated with FIG. 1 will be omitted.

Referring to FIG. 15, an image processing system 400 includes an image sensor 420 and an image processing device 440.

The image sensor 420 sequentially outputs a plurality of image frame data FDAT including information associated with an image of an object based on incident light. The image sensor 420 may be implemented similarly to that described with reference to FIGS. 3 through 6, and a structure of the pixel array may be partially changed because the image sensor 420 does not include AF pixels and includes only normal pixels.

The image processing device 440 sequentially receives the plurality of image frame data FDAT, and sequentially generates a plurality of corrected image frame data CFDAT by sequentially correcting the plurality of image frame data FDAT. The image processing device 440 may be implemented according to example embodiments. For example, the image processing device 440 may be the image processing device 300 of FIG. 14.

Figure 16:
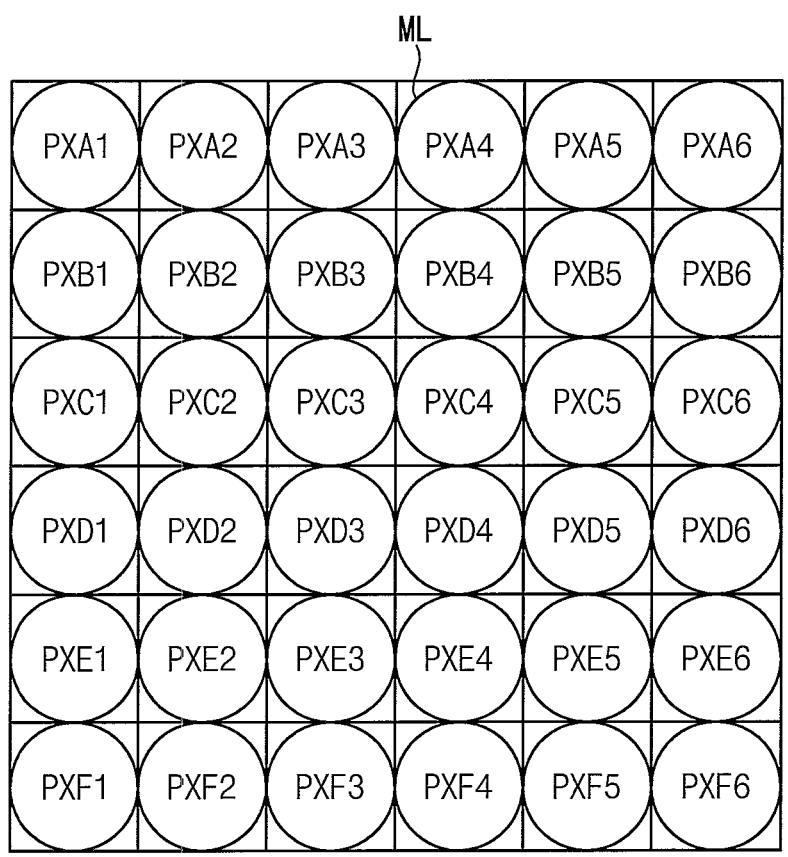
FIG. 16 is a plan view of an example of a pixel array included in an image sensor included in an image processing system of FIG. 15.

FIG. 16 is a plan view of an example of a pixel array included in an image sensor included in an image processing system of FIG. 15. The descriptions repeated with FIG. 5A will be omitted.

Referring to FIG. 16, a pixel array 514 included in an image sensor may include a plurality of pixels PXA1, PXA2, PXA3, PXA4, PXA5, PXA6, PXB1, PXB2, PXB3, PXB4, PXB5, PXB6, PXC1, PXC2, PXC3, PXC4, PXC5, PXC6, PXD1, PXD2, PXD3, PXD4, PXD5, PXD6, PXE1, PXE2, PXE3, PXE4, PXE5, PXE6, PXF1, PXF2, PXF3, PXF4, PXF5 and PXF6.

All of the plurality of pixels PXA1 through PXA6, PXB1 through PXB6, PXC1 through PXC6, PXD1 through PXD6, PXE1 through PXE6, and PXF1 through PXF6 may be normal pixels that detect an image, and micro lenses ML may be disposed thereon. Each of the plurality of pixels PXA1 through PXA6, PXB1 through PXB6, PXC1 through PXC6, PXD1 through PXD6, PXE1 through PXE6, and PXF1 through PXF6 may be implemented as the second pixel NPX in FIG. 5B.

FIGS. 17A, 17B, 17C, 17D, 18A, 18B, 18C and 18D are diagrams for describing an operation of an image processing device according to example embodiments. The descriptions repeated with FIGS. 5C, 7A, 7B and 7C will be omitted.

Figure 17A:
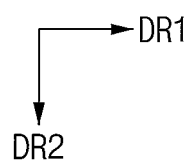
Figure 18A:
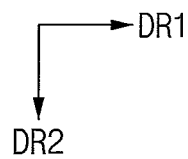

FIG. 17A is a plan view of an example of a color filter array included in the pixel array 514 of FIG. 16. FIGS. 17B, 17C and 17D illustrate an operation when a pixel array of an image sensor has a structure illustrated in FIGS. 16 and 17A. FIG. 18A is a plan view of another example of a color filter array included in the pixel array 514 of FIG. 16. FIGS. 18B, 18C and 18D illustrate an operation when a pixel array of an image sensor has a structure illustrated in FIGS. 16 and 18A.

Referring to FIG. 17A, a color filter array CFAA1 included in the pixel array 514 may include a red filter R, a green filter G, a blue filter B and a white filter W. The pixels PXA2, PXA4, PXA6, PXC2, PXC4, PXC6, PXE2, PXE4 and PXE6 may include the red filter R. The pixels PXA1, PXA3, PXA5, PXC1, PXC3, PXC5, PXE1, PXE3 and PXE5 may include the green filter G. The pixels PXB1, PXB3, PXB5, PXD1, PXD3, PXD5, PXF1, PXF3 and PXF5 may include the blue filter B. The pixels PXB2, PXB4, PXB6, PXD2, PXD4, PXD6, PXF2, PXF4 and PXF6 may include the white filter W.

Referring to FIG. 17B, first image frame data FDATA1 that is provided from the image sensor 420 and corresponds to one image frame may include pixel values PVA2R, PVA4R, PVA6R, PVC2R, PVC4R, PVC6R, PVE2R, PVE4R and PVE6R that are obtained from the pixels PXA2, PXA4, PXA6, PXC2, PXC4, PXE2, PXE4 and PXE6 including the red filter R and correspond to a red color, pixel values PVA1G, PVA3G, PVA5G, PVC1G, PVC3G, PVC5G, PVE1G, PVE3G and PVE5G that are obtained from the pixels PXA1, PXA3, PXA5, PXC1, PXC3, PXC5, PXE1, PXE3 and PXE5 including the green filter G and correspond to a green color, pixel values PVB1B, PVB3B, PVB5B, PVD1B, PVD3B, PVD5B, PVF1B, PVF3B and PVF5B that are obtained from the pixels PXB1, PXB3, PXB5, PXD1, PXD3, PXD5, PXF1, PXF3 and PXF5 including the blue filter B and correspond to a blue color, and pixel values PVB2W, PVB4W, PVB6W, PVD2W, PVD4W, PVD6W, PVF2W, PVF4W and PVF6W that are obtained from the pixels PXB2, PXB4, PXB6, PXD2, PXD4, PXD6, PXF2, PXF4 and PXF6 including the white filter W and correspond to a white color.

Referring to FIG. 17C, first correction information CINFA1 that is stored in the memory 320 and is used for correcting the first image frame data FDATA1 may include correction data CIB2, CIB4, CIB6, CID2, CID4, CID6, CIF2, CIF4 and CIF6 that are used for correcting the pixel values PVB2W, PVB4W, PVB6W, PVD2W, PVD4W, PVD6W, PVF2W, PVF4W and PVF6W.

Referring to FIG. 17D, first corrected image frame data CFDATA1 may be generated by correcting the pixel values PVB2W, PVB4W, PVB6W, PVD2W, PVD4W, PVD6W, PVF2W, PVF4W and PVF6W that are included in the first image frame data FDATA1 of FIG. 17B and correspond to the white color to corrected pixel values PVB2Gc, PVB4Gc, PVB6Gc, PVD2Gc, PVD4Gc, PVD6Gc, PVF2Gc, PVF4Gc and PVF6Gc corresponding to the green color, based on the first correction information CINFA1 of FIG. 17C. For example, an RGBW pattern may be converted into a Bayer pattern.

Referring to FIG. 18A, a color filter array CFAA2 included in the pixel array 514 may include a red filter R, a green filter G, a blue filter B and a white filter W. The pixels PXC2, PXC6, PXD1 and PXD5 may include the red filter R. The pixels PXA2, PXA6, PXB1, PXB5, PXC4, PXD3, PXE2, PXE6, PXF1 and PXF5 may include the green filter G. The pixels PXA4, PXB3, PXE4 and PXF3 may include the blue filter B. The pixels PXA1, PXA3, PXA5, PXB2, PXB4, PXB6, PXC1, PXC3, PXC5, PXD2, PXD4, PXD6, PXE1, PXE3, PXE5, PXF2, PXF4 and PXF6 may include the white filter W.

Referring to FIG. 18B, first image frame data FDATA2 that is provided from the image sensor 420 and corresponds to one image frame may include pixel values PVJ2R, PVJ6R, PVK1R and PVKSR that are obtained from the pixels PXC2, PXC6, PXD1 and PXD5 including the red filter R and correspond to a red color, pixel values PVG2G, PVG6G, PVH1G, PVHSG, PVJ4G, PVK3G, PVL2G, PVL6G, PVM1G and PVMSG that are obtained from the pixels PXA2, PXA6, PXB1, PXB5, PXC4, PXD3, PXE2, PXE6, PXF1 and PXF5 including the green filter G and correspond to a green color, pixel values PVG4B, PVH3B, PVL4B and PVM3B that are obtained from the pixels PXA4, PXB3, PXE4 and PXF3 including the blue filter B and correspond to a blue color, and pixel values PVG1W, PVG3W, PVGSW, PVH2W, PVH4W, PVH6W, PVJ1W, PVJ3W, PVJSW, PVK2W, PVK4W, PVK6W, PVL1W, PVL3W, PVLSW, PVM2W, PVM4W and PVM6W that are obtained from the pixels PXA1, PXA3, PXA5, PXB2, PXB4, PXB6, PXC1, PXC3, PXC5, PXD2, PXD4, PXD6, PXE1, PXE3, PXE5, PXF2, PXF4 and PXF6 including the white filter W and correspond to a white color.

Referring to FIG. 18C, first correction information CINFA2 that is stored in the memory 320 and is used for correcting the first image frame data FDATA2 may include correction data CIG1, CIG3, CIGS, CIH2, CIH4, CIH6, CM, CIJ3, CIJS, CIK2, CIK4, CIK6, CIL1, CIL3, CIL5, CIM2, CIM4 and CIM6 that are used for correcting the pixel values PVG1W, PVG3W, PVG5W, PVH2W, PVH4W, PVH6W, PVJ1W, PVJ3W, PVJ5W, PVK2W, PVK4W, PVK6W, PVL1W, PVL3W, PVL5W, PVM2W, PVM4W and PVM6W.

Referring to FIG. 18D, first corrected image frame data CFDATA2 may be generated by correcting the pixel values PVJ1W, PVJ5W, PVK2W and PVK6W that are included in the first image frame data FDATA2 of FIG. 18B and correspond to the white color to corrected pixel values PVJ1Rc, PVJ5Rc, PVK2Rc and PVK6Rc corresponding to the red color, by correcting the pixel values PVG1W, PVG5W, PVH2W, PVH6W, PVJ3W, PVK4W, PVL1W, PVL5W, PVM2W and PVM6W that are included in the first image frame data FDATA2 of FIG. 18B and correspond to the white color to corrected pixel values PVG1Gc, PVG5Gc, PVH2Gc, PVH6Gc, PVJ3Gc, PVK4Gc, PVL1Gc, PVL5Gc, PVM2Gc and PVM6Gc corresponding to the green color, and by correcting the pixel values PVG3W, PVH4W, PVL3W and PVM4W that are included in the first image frame data FDATA2 of FIG. 18B and correspond to the white color to corrected pixel values PVG3Bc, PVH4Bc, PVL3Bc and PVM4Bc corresponding to the green color, based on the first correction information CINFA2 of FIG. 18C. For example, an RGBW pattern may be converted into a Tetra pattern.

Although example embodiments are described with reference to FIGS. 16, 17A, 17B, 17C, 17D, 18A, 18B, 18C and 18D based on a specific structure of the pixel array, a specific structure of the pixels and specific colors, example embodiments are not limited thereto. For example, example embodiments may be applied or employed when the image sensor includes a pixel array of an arbitrary structure and when at least one pixel value corresponding to an arbitrary color is corrected or converted to correspond to an arbitrary another color.

Figure 19:
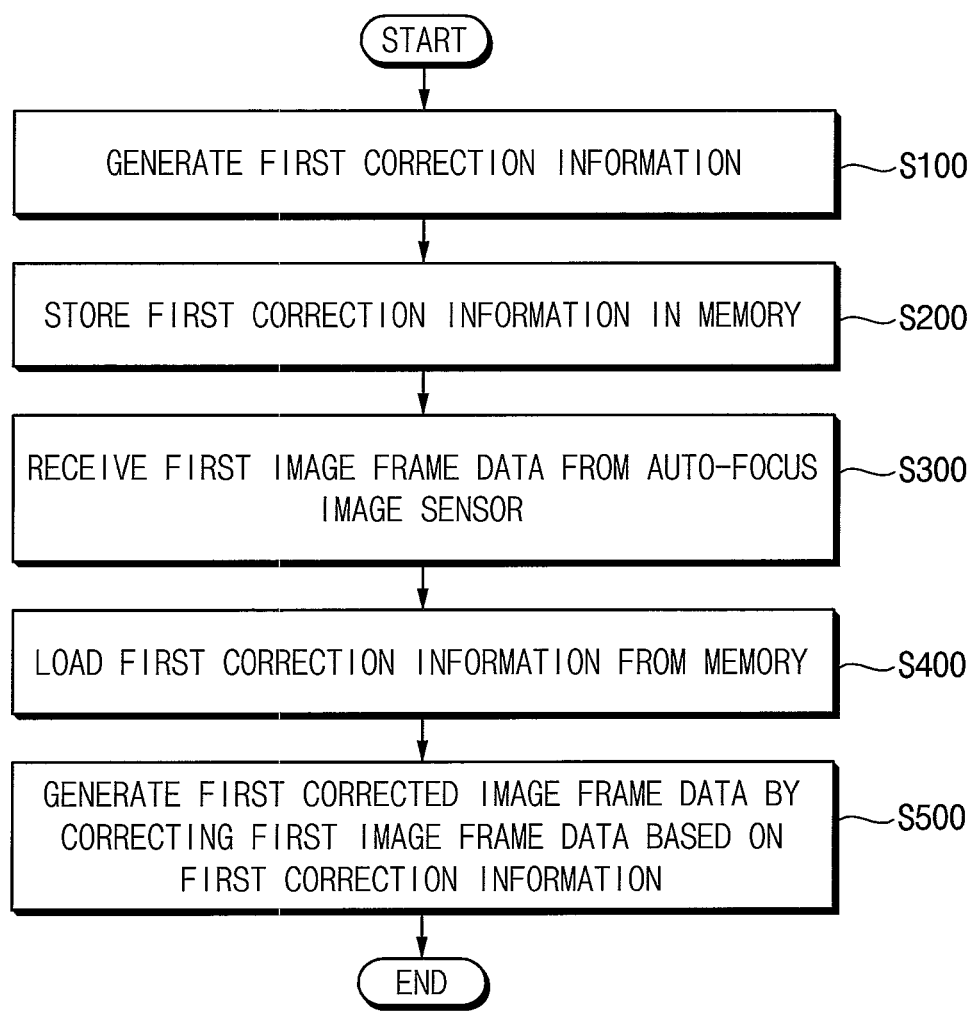
FIG. 19 is a flowchart illustrating an image processing method according to example embodiments.

FIG. 19 is a flowchart illustrating an image processing method according to example embodiments.

Referring to FIGS. 1, 2, 10 and 19, in an image processing method according to example embodiments, the first correction information CINF1 is generated (step S100). As described above, the first correction information CINF1 is used for correcting the first pixel values among the plurality of pixel values that are received from the auto-focus image sensor 220. The auto-focus image sensor 220 includes the first pixels that detect the phase difference and the second pixels that detect the image, the first pixel values are obtained from the first pixels and correspond to the first color, and the first correction information CINF1 is used for correcting the first pixel values (e.g., at least one of the pixel values) to correspond to the second color different from the first color. Step S100 may be performed by the calibration circuit 110 disposed inside or outside the image processing device.

The first correction information CINF1 is stored in the memory 120 (step S200). The first image frame data FDAT1 including the plurality of pixel values is received from the auto-focus image sensor 220 (step S300). The first correction information CINF1 is loaded from the memory 120 (step S400). The first corrected image frame data CFDAT1 is generated by correcting the first pixel values included in the first image frame data FDAT1 to correspond to the second color based on the first correction information CINF1 (step S500). Steps S300, S400 and S500 may be performed by the color correction circuit 140.

Figure 20:
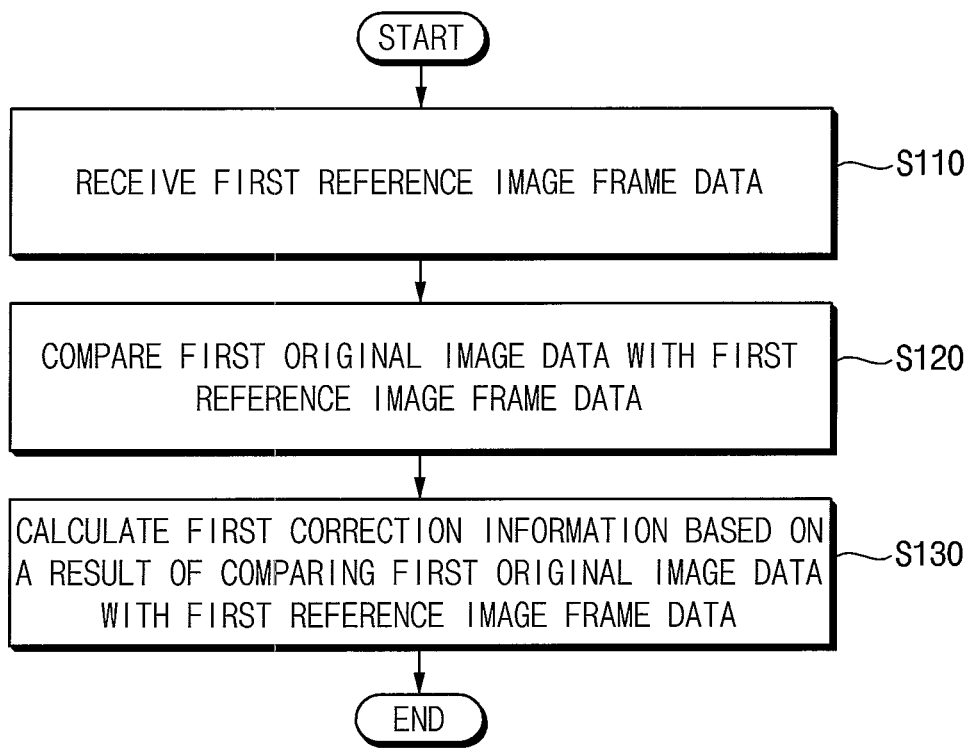
FIG. 20 is a flowchart illustrating an example of generating first correction information in FIG. 19.

FIG. 20 is a flowchart illustrating an example of generating first correction information in FIG. 19.

Referring to FIGS. 2, 10, 11, 19 and 20, when generating the first correction information CINF1 (step S100), the first reference image frame data CRDAT1 that is obtained by capturing the reference pattern by the auto-focus image sensor 220 may be received (step S110). The first reference image frame data CRDAT1 may be compared with the first original image data ORDAT1 corresponding to the reference pattern (step S120). The first correction information CINF1 may be calculated based on a result of comparing the first original image data ORDAT1 with the first reference image frame data CRDAT1 (step S130). Steps S110 and S120 may be performed by the comparator 112, and step S130 may be performed by the calculator 114.

Figure 21:
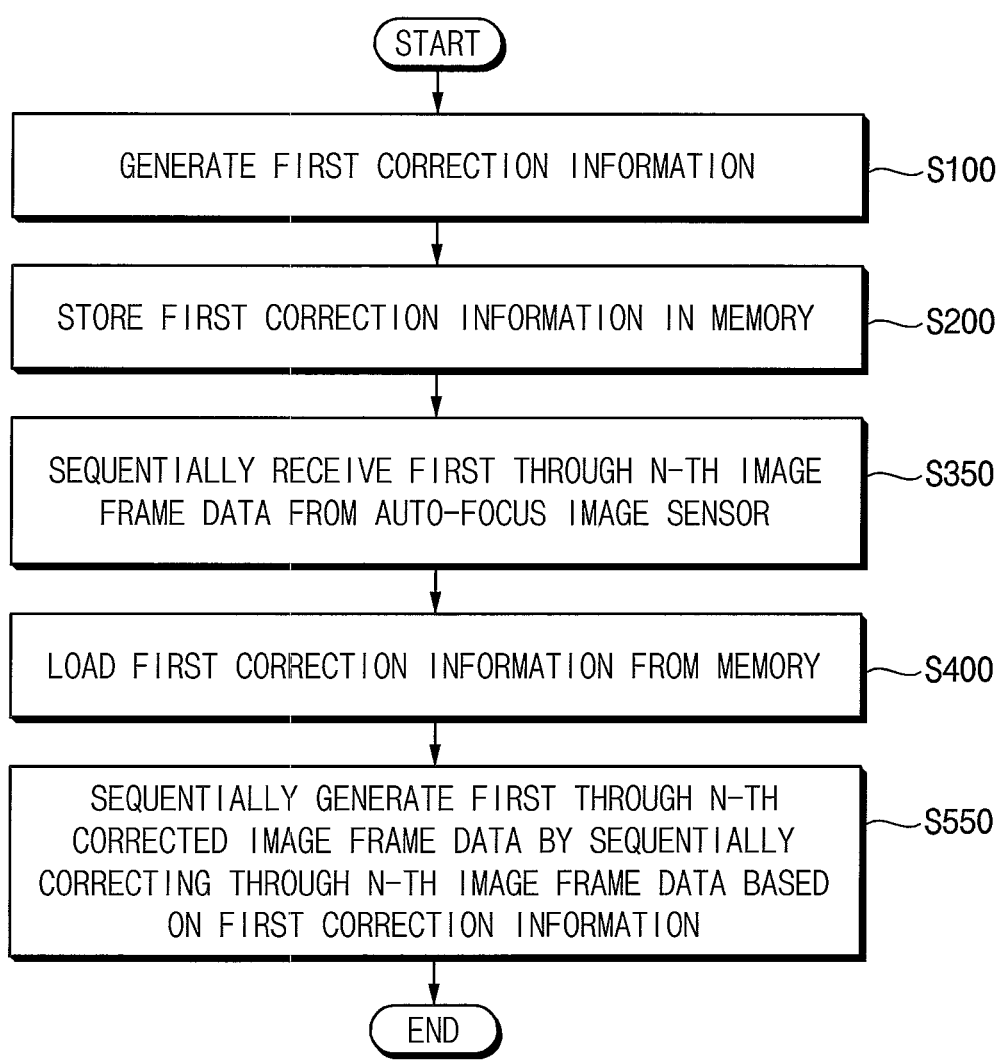
FIGS. 21 and 22 are flowcharts illustrating an image processing method according to example embodiments.
Figure 22:
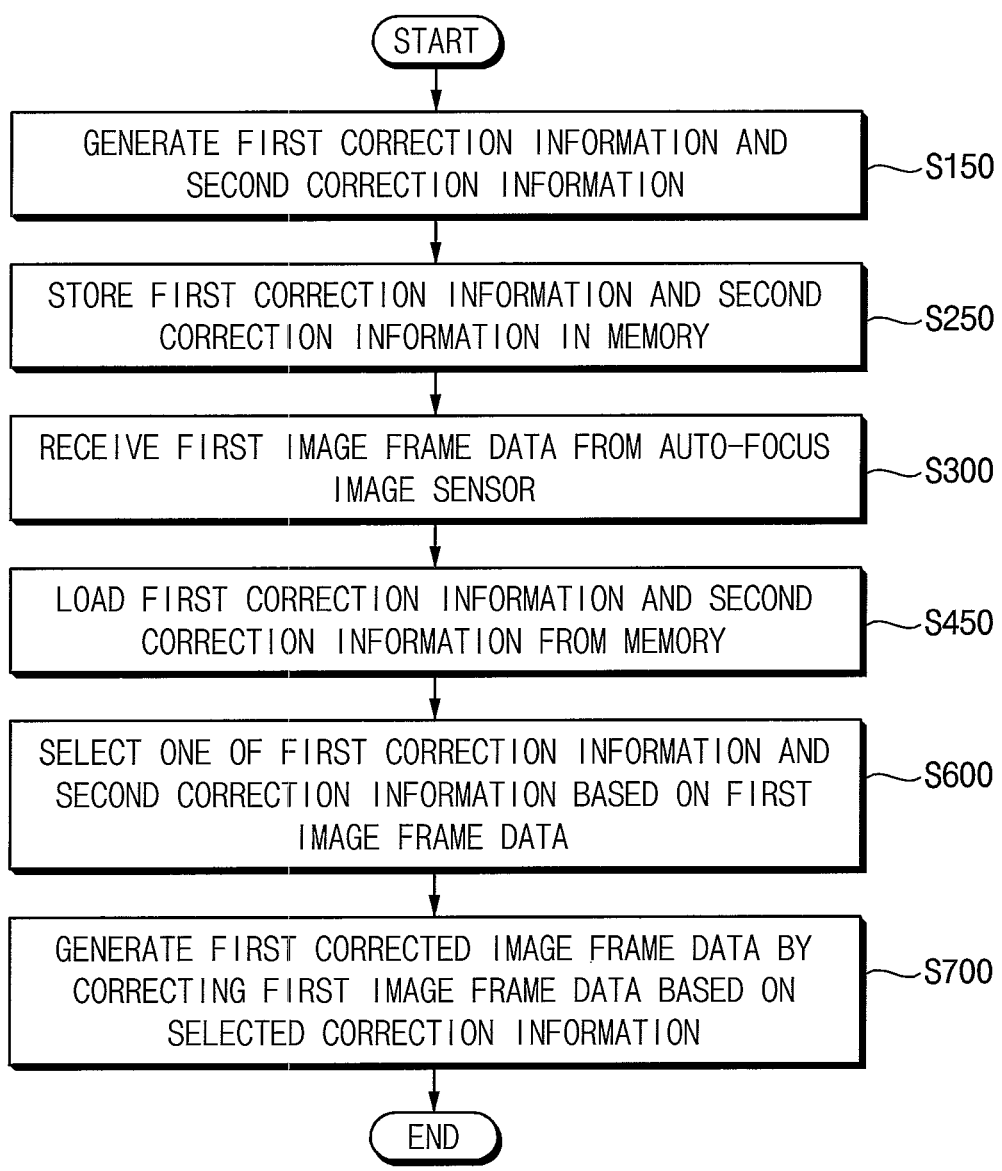

FIGS. 21 and 22 are flowcharts illustrating an image processing method according to example embodiments. The descriptions repeated with FIG. 19 will be omitted.

Referring to FIGS. 1, 2 and 21, in an image processing method according to example embodiments, steps S100, S200 and S400 may be substantially the same as steps S100, S200 and S400 in FIG. 19, respectively.

The first through N-th image frame data are sequentially received from the auto-focus image sensor 220 (step S350). The first through N-th corrected image frame data are sequentially generated by sequentially correcting the first pixel values included in the first through N-th image frame data to correspond to the second color based on the first correction information CINF11 (step S550). The example of FIG. 21 may also be described as sequentially receiving the second through N-th image frame data after step S300 in FIG. 19, and sequentially generating the second through N-th corrected image frame data by sequentially correcting the second through N-th image frame data after step S500 in FIG. 19.

Referring to FIGS. 2, 12, 13 and 22, in an image processing method according to example embodiments, the first correction information CINF1 and the second correction information CINF2 are generated (step S150). The first and second correction information CINF1 and CINF2 are used for correcting the first pixel values corresponding to the first color to correspond to the second color, and are different from each other. The first and second correction information CINF1 and CINF2 are stored in the memory 120 (step S250). Steps S150 and S250 may be similar to steps S100 and S200 in FIG. 19, respectively.

The first image frame data FDAT1 is received from the auto-focus image sensor 220 (step S300). The first and second correction information CINF1 and CINF2 are loaded from the memory 120 (step S450). One of the first and second correction information CINF1 and CINF2 is selected based on the first image frame data FDAT1 (step S600). The first corrected image frame data CFDAT1 is generated by correcting the first pixel values included in first image frame data FDAT1 to correspond to the second color based on the selected correction information SINF (step S700). Steps S300, S450 and S700 may be similar to S300, S400 and S500 in FIG. 19, respectively. Step S600 may be performed by the selector 160.

Figure 23:
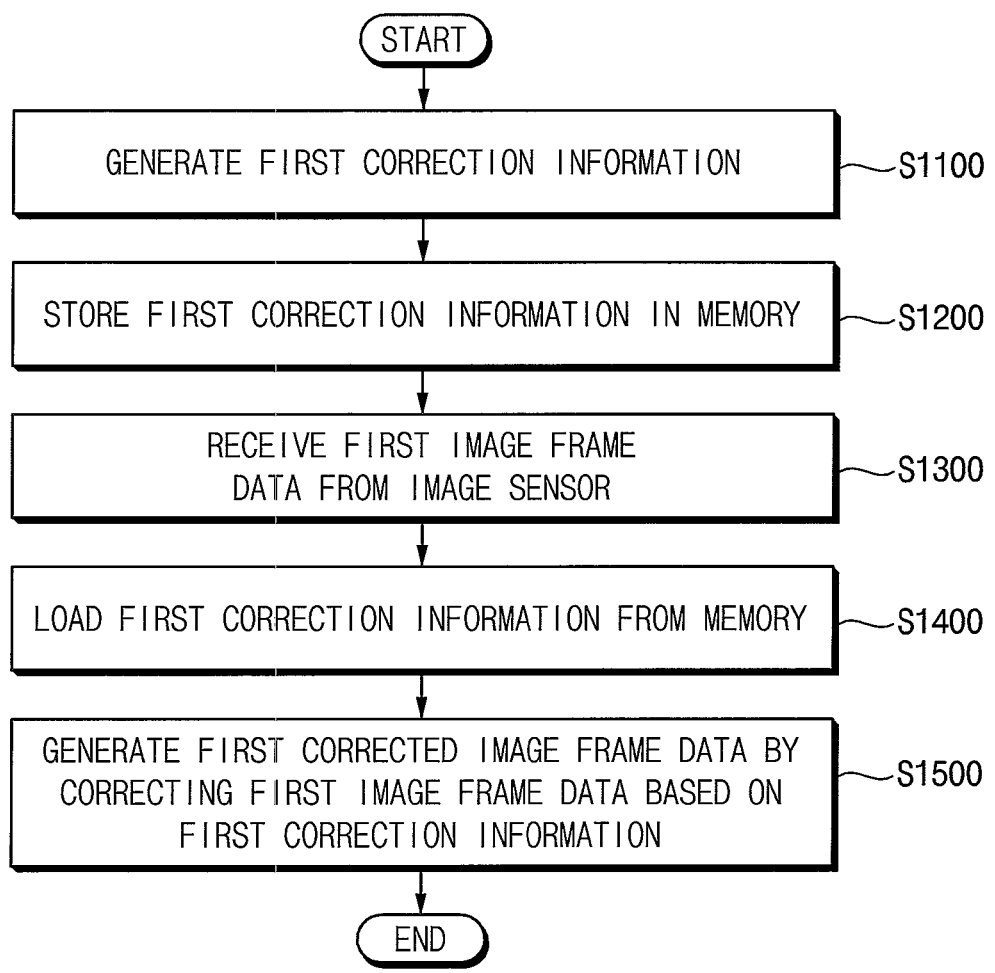
FIG. 23 is a flowchart illustrating an image processing method according to example embodiments.

FIG. 23 is a flowchart illustrating an image processing method according to example embodiments. The descriptions repeated with FIG. 19 will be omitted.

Referring to FIGS. 14, 15 and 23, in an image processing method according to example embodiments, the first correction information CINFA is generated (step S1100). As described above, the first correction information CINFA is used for correcting the first pixel values among the plurality of pixel values that are received from the image sensor 420. The image sensor 420 includes only the plurality of pixels that detect the image, the first pixel values are obtained from the first pixels among the plurality of pixels and correspond to the first color, and the first correction information CINFA is used for correcting the first pixel values to correspond to the second color different from the first color. Step S1100 may be performed by the calibration circuit disposed inside or outside the image processing device.

The first correction information CINFA is stored in the memory 320 (step S1200). The first image frame data FDATA including the plurality of pixel values is received from the image sensor 420 (step S1300). The first correction information CINFA is loaded from the memory 320 (step S1400). The first corrected image frame data CFDATA is generated by correcting the first pixel values included in the first image frame data FDATA to correspond to the second color based on the first correction information CINFA (step S1500). Steps S1300, S1400 and S1500 may be performed by the color correction circuit 340.

As will be appreciated by those skilled in the art, the inventive concept may be implemented using a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium. The computer program product may interface with hardware to implement functions such as those carried out by comparator 112 and calculator 114 of FIG. 11, selector 160 of FIGS. 12 and 13, and other components described herein.

Figure 24:
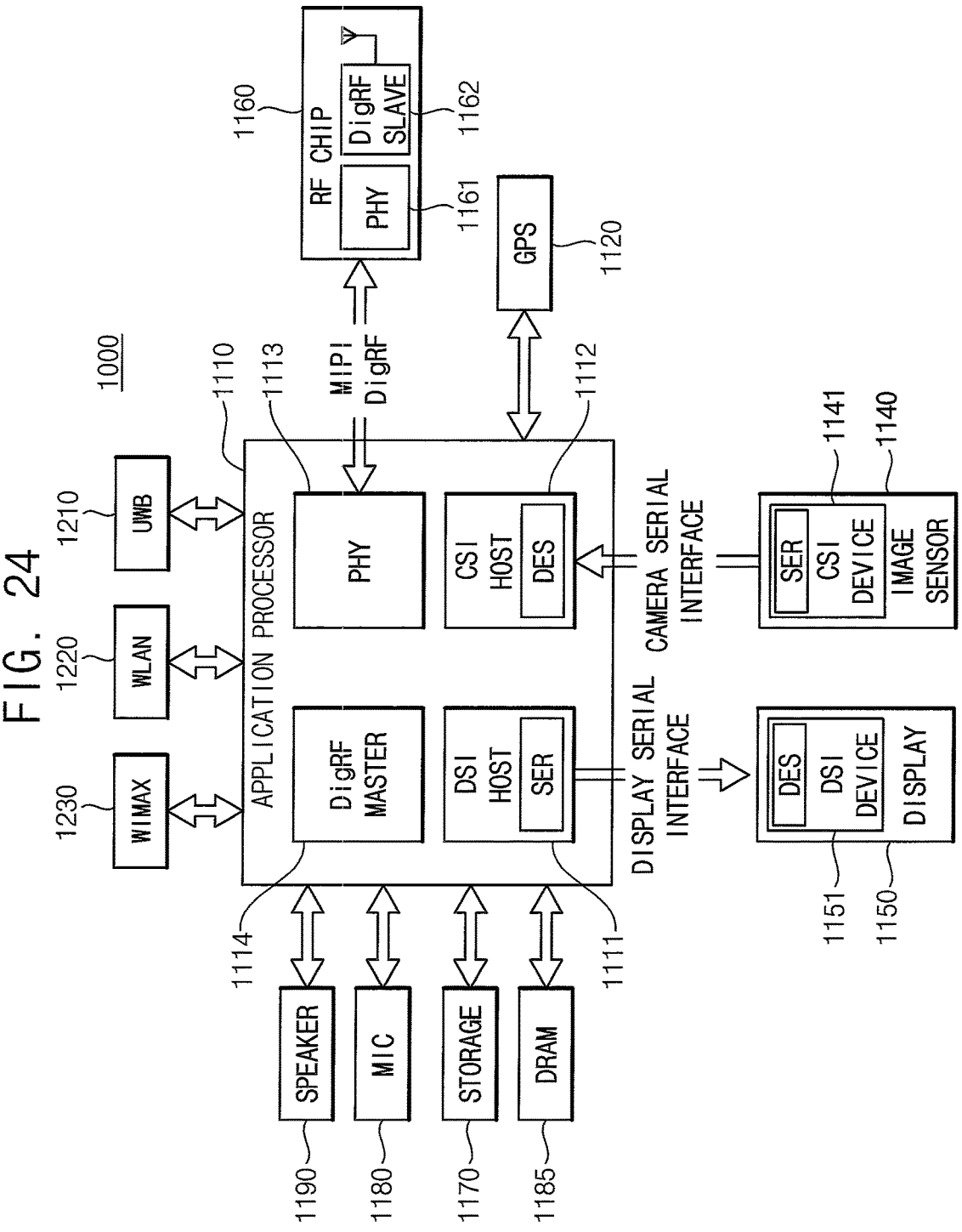
FIG. 24 is a block diagram illustrating an electronic system including an image processing device according to example embodiments.

FIG. 24 is a block diagram illustrating an electronic system including an image processing device according to example embodiments.

Referring to FIG. 24, an electronic system 1000 may be implemented as a data processing device that uses or supports a mobile industry processor interface (MIPI) interface. The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The CSI host 1112 may include the image processing device according to example embodiments, and the CSI host 1112 and the image sensor 1140 may form the image processing system according to example embodiments. The image sensor 1140 may be the auto-focus image sensor and/or the image sensor included in the image processing system according to example embodiments. The CSI host 1112 and the image sensor 1140 may operate based on the method according to example embodiments.

The inventive concept may be applied to various devices and systems that include the image processing devices and the image sensors. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image processing device comprising:
a memory configured to store first correction information for correcting first pixel values among a plurality of pixel values, the plurality of pixel values being received from an auto-focus image sensor including first pixels configured to detect a phase difference and second pixels configured to detect an image, the first pixel values being obtained from the first pixels and corresponding to a first color, the first correction information including information used in a calculation for correcting the first pixel values to correspond to a second color different from the first color; and
a color correction circuit configured to receive first image frame data including the plurality of pixel values from the auto-focus image sensor, to load the first correction information from the memory, and to generate first corrected image frame data by correcting the first pixel values included in the first image frame data to correspond to the second color by performing the calculation which uses the stored first correction information and the first pixel values as inputs.

2. The image processing device of claim 1, further comprising:
a calibration circuit configured to generate the first correction information stored in the memory.

3. The image processing device of claim 2, wherein the calibration circuit includes:
a comparator configured to receive reference image frame data obtained by capturing a reference pattern by the auto-focus image sensor, and to compare original image data corresponding to the reference pattern with the reference image frame data; and
a calculator configured to calculate the first correction information based on a result of comparing the original image data with the reference image frame data.

4. The image processing device of claim 2, wherein the calibration circuit is configured to generate the first correction information and to store the first correction information in the memory before the auto-focus image sensor normally operates.

5. The image processing device of claim 4, wherein the calibration circuit is configured to be disabled while the auto-focus image sensor normally operates.

6. The image processing device of claim 1, wherein the color correction circuit is configured to:
sequentially receive second image frame data through N-th image frame data subsequent to the first image frame data from the auto-focus image sensor, where N is a natural number greater than or equal to two, and
sequentially generate second corrected image frame data through N-th corrected image frame data by sequentially correcting the second image frame data through the N-th image frame data based on the first correction information.

7. The image processing device of claim 1, wherein the first correction information includes:
a plurality of gains used for converting the first pixel values corresponding to the first color into first corrected pixel values corresponding to the second color; and
a plurality of position data representing positions of the first pixels.

8. The image processing device of claim 7, wherein the first pixel values and adjacent pixel values obtained from adjacent pixels adjacent to the first pixels among the second pixels are used for generating the first corrected pixel values.

9. The image processing device of claim 7, wherein the first correction information further includes:
a plurality of offsets used for converting the first pixel values into the first corrected pixel values.

10. The image processing device of claim 9, wherein the first pixel values are the only first pixel values used for generating the first corrected pixel values.

11. The image processing device of claim 1, wherein:
the memory is configured to further store second correction information different from the first correction information, the second correction information for correcting the first pixel values to correspond to the second color, and
the image processing device further includes:
a selector configured to select one of the first correction information and the second correction information based on the first image frame data.

12. The image processing device of claim 11, wherein the color correction circuit is configured to generate the first corrected image frame data by correcting the first image frame data based on one of the first correction information and the second correction information selected by the selector.

13. The image processing device of claim 11, wherein the first correction information corresponds to a first color temperature, and the second correction information corresponds to a second color temperature different from the first color temperature.

14. The image processing device of claim 1, wherein each of the first pixels includes:
a first photoelectric conversion region and a second photoelectric conversion region in a substrate;
a first color filter on the first and second photoelectric conversion regions and having the first color; and
a first micro lens on the first color filter and shared by the first and second photoelectric conversion regions.

15. The image processing device of claim 14, wherein each of the second pixels includes:
a third photoelectric conversion region in the substrate;
a second color filter on the third photoelectric conversion region; and
a second micro lens on the second color filter.

16. The image processing device of claim 15, wherein:
the first photoelectric conversion region, the second photoelectric conversion region and the third photoelectric conversion region have a same size, and
a size of the first micro lens is larger than a size of the second micro lens.

17. An image processing method comprising:
generating first correction information for correcting first pixel values among a plurality of pixel values, the plurality of pixel values being received from an auto-focus image sensor including first pixels configured to detect a phase difference and second pixels configured to detect an image, the first pixel values being obtained from the first pixels and corresponding to a first color, the first correction information being used for correcting the first pixel values to correspond to a second color different from the first color;

storing the first correction information in a memory;

receiving first image frame data including the plurality of pixel values from the auto-focus image sensor;

loading the first correction information from the memory; and generating first corrected image frame data by correcting the first pixel values included in the first image frame data to correspond to the second color by performing a calculation that uses the first correction information and the first pixel values as inputs, wherein the first correction information includes at least one of a gain and an offset for correcting the first pixel values to correspond to the second color different from the first color.

18. The image processing method of claim 17, wherein generating the first correction information includes:

receiving reference image frame data obtained by capturing a reference pattern by the auto-focus image sensor;

comparing original image data corresponding to the reference pattern with the reference image frame data; and calculating the first correction information based on a result of comparing the original image data with the reference image frame data.

19. The image processing method of claim 17, further comprising:

sequentially receiving second image frame data through N-th image frame data subsequent to the first image frame data from the auto-focus image sensor, where N is a natural number greater than or equal to two; and sequentially generating second corrected image frame data through N-th corrected image frame data by sequentially correcting the second image frame data through the N-th image frame data based on the first correction information.

20. An image processing system comprising:

an auto-focus image sensor including first pixels configured to detect a phase difference and second pixels configured to detect an image; and an image processing device configured to perform an image processing operation on image frame data provided from the auto-focus image sensor, wherein the image processing device includes:

a calibration circuit configured to receive reference image frame data obtained by capturing a reference pattern by the auto-focus image sensor, to compare original image data corresponding to the reference pattern with the reference image frame data, and to calculate first correction information based on a result of comparing the original image data with the reference image frame data, the first correction information for correcting first pixel values among a plurality of pixel values received from the auto-focus image sensor, the first pixel values being obtained from the first pixels and corresponding to a first color, the first correction information for correcting the first pixel values to correspond to a second color different from the first color;

a memory configured to receive the first correction information from the calibration circuit, and to store the first correction information; and a color correction circuit configured to receive first image frame data including the plurality of pixel values from the auto-focus image sensor, to load the first correction information from the memory, and to generate first corrected image frame data by correcting the first pixel values included in the first image frame data to correspond to the second color based on the first correction information, wherein the first correction information includes:

a plurality of gains and a plurality of offsets used for converting the first pixel values corresponding to the first color into first corrected pixel values corresponding to the second color; and a plurality of position data representing positions of the first pixels, and wherein the calibration circuit and the memory are configured to generate the first correction information and to store the first correction information before the auto-focus image sensor normally operates.

* * * * *